US011395327B2

(12) United States Patent
Yang et al.

(10) Patent No.: US 11,395,327 B2
(45) Date of Patent: Jul. 19, 2022

(54) UPLINK CONFIGURED GRANT VALIDATION

(71) Applicant: QUALCOMM incorporated, San Diego, CA (US)

(72) Inventors: Wei Yang, San Diego, CA (US); Jing Jiang, San Diego, CA (US); Linhai He, San Diego, CA (US); Gabi Sarkis, San Diego, CA (US); Seyedkianoush Hosseini, San Diego, CA (US); Joseph Binamira Soriaga, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/788,967

(22) Filed: Feb. 12, 2020

(65) Prior Publication Data
US 2020/0260478 A1 Aug. 13, 2020

Related U.S. Application Data

(60) Provisional application No. 62/805,249, filed on Feb. 13, 2019.

(51) Int. Cl.
*H04W 72/14* (2009.01)
*H04L 1/18* (2006.01)
(Continued)

(52) U.S. Cl.
CPC ........... *H04W 72/14* (2013.01); *H04L 1/1819* (2013.01); *H04W 72/042* (2013.01); *H04W 72/1268* (2013.01)

(58) Field of Classification Search
CPC ....... H04L 1/18; H04L 5/0046; H04L 5/0055; H04L 5/0051; H04L 1/0026;
(Continued)

(56) References Cited

U.S. PATENT DOCUMENTS

| 11,240,838 B2 * | 2/2022 | Lee ........................ H04W 80/02 |
| 2017/0013565 A1 * | 1/2017 | Pelletier .............. H04W 52/365 |

(Continued)

FOREIGN PATENT DOCUMENTS

WO  WO-2018183100 A1  10/2018

OTHER PUBLICATIONS

U.S. Appl. No. 62/805,249, filed Feb. 13, 2019, 122 pages.
(Continued)

*Primary Examiner* — Oussama Roudani
(74) *Attorney, Agent, or Firm* — Qualcomm Incorporated

(57) ABSTRACT

Methods, systems, and devices for wireless communication are described. Generally, the described techniques provide for efficiently determining whether to transmit an uplink transmission scheduled by a semi-static grant or a dynamic uplink transmission scheduled by a dynamic grant when the dynamic uplink transmission conflicts with the uplink transmission scheduled by the semi-static grant. In particular, if a user equipment (UE) determines that a dynamic grant is received within a threshold time before an uplink transmission scheduled by a semi-static grant, the UE may transmit the uplink transmission scheduled by the semi-static grant and refrain from transmitting the dynamic transmission. Alternatively, if the UE determines that a dynamic grant is received in advance of a threshold time before an uplink transmission scheduled by a semi-static grant, the UE may transmit the dynamic transmission and refrain from transmitting the uplink transmission scheduled by the semi-static grant.

21 Claims, 18 Drawing Sheets

US 11,395,327 B2
Page 2

(51) Int. Cl.
*H04W 72/04* (2009.01)
*H04W 72/12* (2009.01)

(58) Field of Classification Search
CPC ... H04L 5/0057; H04L 1/0031; H04L 1/1812; H04L 1/1887; H04L 1/1678; H04W 72/1284; H04W 76/27; H04W 72/14
See application file for complete search history.

(56) References Cited

U.S. PATENT DOCUMENTS

| | | | |
|---|---|---|---|
| 2017/0272199 A1* | 9/2017 | Dinan | H04L 1/1822 |
| 2018/0220440 A1 | 8/2018 | Dudda et al. | |
| 2018/0279327 A1* | 9/2018 | Ying | H04L 5/0044 |
| 2018/0368174 A1* | 12/2018 | Jeon | H04W 72/044 |
| 2019/0098644 A1 | 3/2019 | Loehr et al. | |
| 2019/0132857 A1 | 5/2019 | Babaei et al. | |
| 2019/0174472 A1* | 6/2019 | Lee | H04L 1/1864 |
| 2019/0174489 A1 | 6/2019 | Dinan | |
| 2019/0230701 A1* | 7/2019 | Golitschek Edler Von Elbwart | H04B 17/336 |
| 2019/0254053 A1* | 8/2019 | Ying | H04L 5/00 |
| 2019/0268104 A1* | 8/2019 | Zou | H04L 1/1812 |
| 2019/0289638 A1* | 9/2019 | Kung | H04L 1/1887 |
| 2019/0319824 A1 | 10/2019 | Rico Alvarino et al. | |
| 2019/0327755 A1* | 10/2019 | Xiong | H04L 5/0055 |
| 2019/0335488 A1 | 10/2019 | Xiong et al. | |
| 2020/0045722 A1* | 2/2020 | Bae | H04W 72/1284 |
| 2021/0021385 A1* | 1/2021 | Chen | H04W 72/1284 |

OTHER PUBLICATIONS

International Search Report and Written Opinion—PCT/US2020/018159—ISAEPO—dated Jul. 21, 2020.
International Search Report and Written Opinion—PCT/US2020/018159—ISA/EPO—dated Oct. 5, 2020.
Huawei, et al., "Potential RAN1 Impacts on Intra-UE Prioritization," 3GPP Draft, 3GPP TSG RAN WG1 Meeting #94, R1-1809347, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 20, 2018-Aug. 24, 2018, Aug. 11, 2018 (Aug. 11, 2018), XP051516711, 9 pages, Retrieved from the Internet: URL: http://www.3gpp.org/ftp/tsg%5Fran/WG1%5FRL1/TSGR1%5F94/Docs/R1%2D1809347%2Ezip [retrieved on Aug. 11, 2018] paragraph [0002] —paragraph [02.2].
Huawei, et al., "UL Intra-UE Multiplexing," 3GPP Draft, 3GPP TSG RAN WG1 Ad-Hoc Meeting 1901, R1-1900868, 3rd Generation Partnership Project (3GPP), Mobile Competence Centre, 650, Route Des Lucioles, F-06921, Sophia-Antipolis Cedex, France, vol. RAN WG1, No. Taipei; Jan. 25, 2019-Jan. 25, 2019, Jan. 20, 2019 (Jan. 20, 2019), XP051593714, 6 pages, Retrieved from the Internet: URL: http://www.3gpp.org/ftp/Meetings%5F3GPP%5FSYNC/RAN1/Docs/R1%2D1900868%2Ezip [retrieved on Jan. 20, 2019] paragraph [0002].
Interdigital Communications, et al., "Intra-UE Prioritization / Multiplexing for Scenarios 2-5,", 3GPP Draft, 3GPP TSG-RAN WG1 Ad-Hoc Meeting 1901, R1-1900767 (NR R16 URLLC SI Al 7264 SC2-5), 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593613, 5 pages, Retrieved from the Internet: URL: http://www.3gpp.org/ftp/Meetings%5F3GPP%5FSYNC/RAN1/Docs/R1%2D1900767%2Ezip retrieved on Jan. 20, 2919] paragraph [0002] —paragraph [0003].
Partial International Search Report—PCT/US2020/018159—ISA/EPO—May 25, 2020.
Zte, et al., "Consideration on Intra-UE Prioritization/multiplexing," 3GPP Draft, 3GPP TSG-RAN WG2 Meeting #104 bis, R2-1817070, Considerations on the Intra-UE Prioritization, 3rd Generation Partnership Project (3GPP), Mobile Competence Centre, 650, Route Des Lucioles, F-06921, Sophia-Antipolis Cedex, France, vol. RAN WG2.Nno. Spokane, USA; Nov. 12, 2018-Nov. 16, 2018, Nov. 12, 2018 (Nov. 12, 2018), XP051556617, 5 pages, Retrieved from the Internet: URL: http://www.3gpp.org/ftp/Meetings%5F3GPP%5FSYNC/RAN2/Docs/R2%2D1817070%2Ezip [retrieved on Nov. 2, 2018] paragraph [0002] —paragraph [2.2.3].
QUALCOMM: "Draft CR on Guard Period for Dynamic Grant Overriding Configured Grant", R1-1903031,3GPP TSG RAN WG1 #96, Athens, Greece, Feb 25-Mar. 1, 2019, 3 Pages.
VIVO: "Collision Between Grant-based and Grant-free Resources on the Same UL Carrier", R2-1708488, 3GPP TSG-RAN WG2 Meeting#99, Berlin, Germany, Aug. 21-25, 2017, 4 Pages.
VIVO: "Remaining Issues on UL Data Transmission for URLLC", 3GPP Draft, 3GPP TSG RAN WG1 Meeting #92bis, R1-1806070, Remaining Issues on UL Data Transmission for URLLC, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018, XP051441284, 5 Pages, Retrieved from the Internet: URL: http://www.3gpp.org/Meetings%5F3GPP%5FSYNC/RAN1/Docs/ [retrieved on May 20, 2018] sections 2.2 and 2.3.

* cited by examiner

UPLINK CONFIGURED GRANT VALIDATION

CROSS REFERENCE

The present application for patent claims the benefit of U.S. Provisional Patent Application No. 62/805,249 by YANG et al., entitled "UPLINK CONFIGURED GRANT VALIDATION," filed Feb. 13, 2019, assigned to the assignee hereof, and which is expressly incorporated by reference herein.

BACKGROUND

The following relates generally to wireless communications, and more specifically to uplink configured grant validation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a base station may use semi-static grants (e.g., in addition to dynamic grants) to allocate resources to a UE for uplink transmissions. Since semi-static grants may be transmitted less frequently than dynamic grants, the use of semi-static grants may limit overhead in a wireless communications system. In some cases, however, a base station may schedule conflicting uplink transmissions from a UE using a semi-static grant and a dynamic grant, which may result in inefficiencies in a wireless communications system.

SUMMARY

The described techniques relate to improved methods, systems, devices, and apparatuses that support uplink configured grant validation. Generally, the described techniques provide for efficiently determining whether to transmit an uplink transmission scheduled by a semi-static grant or a dynamic uplink transmission scheduled by a dynamic grant, when the dynamic uplink transmission conflicts with the uplink transmission scheduled by the semi-static grant. In particular, if a user equipment (UE) determines that a dynamic grant is received within a threshold time before an uplink transmission scheduled by a semi-static grant, the UE may transmit the uplink transmission scheduled by the semi-static grant and refrain from transmitting the dynamic transmission (i.e., the UE may validate the semi-static grant). Alternatively, if the UE determines that a dynamic grant is received in advance of a threshold time before an uplink transmission scheduled by a semi-static grant, the UE may transmit the dynamic transmission and refrain from transmitting the uplink transmission scheduled by the semi-static grant (i.e., the UE may invalidate the semi-static grant).

A method for wireless communication at a UE is described. The method may include obtaining a semi-static uplink grant received from a base station, the semi-static uplink grant scheduling a set of uplink transmission occasions, the set of uplink transmission occasions including an uplink transmission occasion for a first uplink transmission, obtaining, before one of the plurality of uplink transmission occasions corresponding to the semi-static uplink grant, downlink control information received from the base station, the downlink control information including a grant for a second uplink transmission, where the second uplink transmission conflicts with the first uplink transmission, and outputting data for one of the first uplink transmission or the second uplink transmission based on a comparison of a receive time of the downlink control information and the scheduled transmit time of the first uplink transmission.

An apparatus for wireless communication at a UE is described. The apparatus may include a processor, memory in electronic communication with the processor, and instructions stored in the memory. The instructions may be executable by the processor to cause the apparatus to obtain a semi-static uplink grant received from a base station, the semi-static uplink grant scheduling a set of uplink transmission occasions, the set of uplink transmission occasions including an uplink transmission occasion for a first uplink transmission, obtain, before one of the plurality of uplink transmission occasions corresponding to the semi-static uplink grant, downlink control information received from the base station, the downlink control information including a grant for a second uplink transmission, where the second uplink transmission conflicts with the first uplink transmission, and output data for one of the first uplink transmission or the second uplink transmission based on a comparison of a receive time of the downlink control information and the scheduled transmit time of the first uplink transmission.

Another apparatus for wireless communication at a UE is described. The apparatus may include means for obtaining a semi-static uplink grant received from a base station, the semi-static uplink grant scheduling a set of uplink transmission occasions, the set of uplink transmission occasions including an uplink transmission occasion for a first uplink transmission, obtaining, before one of the plurality of uplink transmission occasions corresponding to the semi-static uplink grant, downlink control information received from the base station, the downlink control information including a grant for a second uplink transmission, where the second uplink transmission conflicts with the first uplink transmission, and outputting data for one of the first uplink transmission or the second uplink transmission based on a comparison of a receive time of the downlink control information and the scheduled transmit time of the first uplink transmission.

A non-transitory computer-readable medium storing code for wireless communication at a UE is described. The code may include instructions executable by a processor to obtain a semi-static uplink grant received from a base station, the semi-static uplink grant scheduling a set of uplink transmission occasions, the set of uplink transmission occasions including an uplink transmission occasion for a first uplink transmission, obtain, before one of the plurality of uplink transmission occasions corresponding to the semi-static uplink grant, downlink control information received from the base station, the downlink control information including a grant for a second uplink transmission, where the second uplink transmission conflicts with the first uplink transmission, and output data for one of the first uplink transmission or the second uplink transmission based on a comparison of a receive time of the downlink control information and the scheduled transmit time of the first uplink transmission.

In some examples of the method, apparatuses, and non-transitory computer-readable medium described herein, outputting data for one of the first uplink transmission or the second uplink transmission based on the comparison may include operations, features, means, or instructions for determining whether the receive time of the downlink control information may be within a threshold time before the scheduled transmit time of the first uplink transmission, and outputting data for one of the first uplink transmission or the second uplink transmission based on the determining. Some examples of the method, apparatuses, and non-transitory computer-readable medium described herein may further include operations, features, means, or instructions for determining that the receive time of the downlink control information may be within the threshold time before the scheduled transmit time of the first uplink transmission, outputting data for the first uplink transmission based on the determining, and refraining from outputting data for the second uplink transmission based on the determining.

Some examples of the method, apparatuses, and non-transitory computer-readable medium described herein may further include operations, features, means, or instructions for determining that the receive time of the downlink control information may be in advance of the threshold time before the scheduled transmit time of the first uplink transmission, outputting data for the second uplink transmission based on the determining, and refraining from outputting data for the first uplink transmission based on the determining. Some examples of the method, apparatuses, and non-transitory computer-readable medium described herein may further include operations, features, means, or instructions for determining that the receive time of the downlink control information may be within the threshold time before the scheduled transmit time of the first uplink transmission, identifying data to be outputted for the first uplink transmission, outputting data for the first uplink transmission based on identifying the data to be transmitted, and refraining from outputting data for the second uplink transmission.

Some examples of the method, apparatuses, and non-transitory computer-readable medium described herein may further include operations, features, means, or instructions for determining that the receive time of the downlink control information may be within the threshold time before the scheduled transmit time of the first uplink transmission, identifying that there may be no data to be outputted for the first uplink transmission, refraining from outputting data for the first uplink transmission, and outputting data for the second uplink transmission. Some examples of the method, apparatuses, and non-transitory computer-readable medium described herein may further include operations, features, means, or instructions for determining that an uplink control information transmission overlaps with the first uplink transmission, determining whether the receive time of the downlink control information may be within another threshold time before a scheduled transmit time of the uplink control information transmission, and outputting data for one of the first uplink transmission or the second uplink transmission based on the determining.

Some examples of the method, apparatuses, and non-transitory computer-readable medium described herein may further include operations, features, means, or instructions for determining that the receive time of the downlink control information may be within the other threshold time before the scheduled transmit time of the uplink control information transmission, outputting data for the first uplink transmission based on the determining, and refraining from outputting data for the second uplink transmission based on the determining. Some examples of the method, apparatuses, and non-transitory computer-readable medium described herein may further include operations, features, means, or instructions for determining that the receive time of the downlink control information may be in advance of the other threshold time before the scheduled transmit time of the uplink control information transmission, outputting data for the second uplink transmission based on the determining, and refraining from outputting data for the first uplink transmission based on the determining.

Some examples of the method, apparatuses, and non-transitory computer-readable medium described herein may further include operations, features, means, or instructions for determining that the receive time of the downlink control information may be within the other threshold time before the scheduled transmit time of the uplink control information transmission, identifying data to be outputted for the first uplink transmission, outputting data for the first uplink transmission based on identifying the data to be transmitted, and refraining from outputting data for the second uplink transmission. Some examples of the method, apparatuses, and non-transitory computer-readable medium described herein may further include operations, features, means, or instructions for determining that the receive time of the downlink control information may be within the other threshold time before the scheduled transmit time of the uplink control information transmission, identifying that there may be no data to be outputted for the first uplink transmission, refraining from outputting data for the first uplink transmission, and outputting data for the second uplink transmission.

Some examples of the method, apparatuses, and non-transitory computer-readable medium described herein may further include operations, features, means, or instructions for determining which of the first uplink transmission, the second uplink transmission, and the uplink control information transmission may have an earliest starting time, where a reference point from which the threshold time may be measured corresponds to the earliest starting time. In some examples of the method, apparatuses, and non-transitory computer-readable medium described herein, the threshold time corresponds to a processing time for processing the downlink control information. In some examples of the method, apparatuses, and non-transitory computer-readable medium described herein, the threshold time corresponds to a processing time for processing the downlink control information and for preparing the first uplink transmission.

In some examples of the method, apparatuses, and non-transitory computer-readable medium described herein, the threshold time may be a first threshold time corresponding to a first processing time for determining resources allocated for the second uplink transmission based on the downlink control information or a second threshold time corresponding to a second processing time for determining a hybrid automatic repeat request process identifier associated with the second uplink transmission based on the downlink control information. Some examples of the method, apparatuses, and non-transitory computer-readable medium described herein may further include operations, features, means, or instructions for determining which of the first uplink transmission and the second uplink transmission may have an earlier starting time, where a reference point from which the threshold time may be measured corresponds to the earlier starting time.

Some examples of the method, apparatuses, and non-transitory computer-readable medium described herein may further include operations, features, means, or instructions for determining that the second uplink transmission conflicts with the first uplink transmission, where the outputting data for one of the first uplink transmission or the second uplink transmission may be further based on the determining. In some examples of the method, apparatuses, and non-transitory computer-readable medium described herein, determining that the second uplink transmission conflicts with the first uplink transmission may include operations, features, means, or instructions for determining that the second uplink transmission and the first uplink transmission may be scheduled on overlapping time resources.

In some examples of the method, apparatuses, and non-transitory computer-readable medium described herein, determining that the second uplink transmission conflicts with the first uplink transmission may include operations, features, means, or instructions for determining that a hybrid automatic repeat request (HARQ) process identifier (ID) associated with the second uplink transmission may be the same as the HARQ process ID associated with the first uplink transmission, and determining that a timer for the HARQ process ID associated with the first uplink transmission and the second uplink transmission may be running at a scheduled transmit time of the first uplink transmission.

A method for wireless communication at a base station is described. The method may include outputting data for a semi-static uplink grant to a UE, the semi-static uplink grant scheduling a set of uplink transmission occasions, the set of uplink transmission occasions including an uplink transmission occasion for a first uplink transmission, outputting, before a scheduled receive time of the first uplink transmission, data for downlink control information to the UE, the downlink control information including a grant for a second uplink transmission, where the second uplink transmission conflicts with the first uplink transmission, and obtaining one of the first uplink transmission or the second uplink transmission received from the UE based on a comparison of a transmit time of the downlink control information and the scheduled receive time of the first uplink transmission.

An apparatus for wireless communication at a base station is described. The apparatus may include a processor, memory in electronic communication with the processor, and instructions stored in the memory. The instructions may be executable by the processor to cause the apparatus to output data for a semi-static uplink grant to a UE, the semi-static uplink grant scheduling a set of uplink transmission occasions, the set of uplink transmission occasions including an uplink transmission occasion for a first uplink transmission, output, before a scheduled receive time of the first uplink transmission, data for downlink control information to the UE, the downlink control information including a grant for a second uplink transmission, where the second uplink transmission conflicts with the first uplink transmission, and obtain one of the first uplink transmission or the second uplink transmission received from the UE based on a comparison of a transmit time of the downlink control information and the scheduled receive time of the first uplink transmission.

Another apparatus for wireless communication at a base station is described. The apparatus may include means for outputting data for a semi-static uplink grant to a UE, the semi-static uplink grant scheduling a set of uplink transmission occasions, the set of uplink transmission occasions including an uplink transmission occasion for a first uplink transmission, outputting, before a scheduled receive time of the first uplink transmission, data for downlink control information to the UE, the downlink control information including a grant for a second uplink transmission, where the second uplink transmission conflicts with the first uplink transmission, and obtaining one of the first uplink transmission or the second uplink transmission received from the UE based on a comparison of a transmit time of the downlink control information and the scheduled receive time of the first uplink transmission.

A non-transitory computer-readable medium storing code for wireless communication at a base station is described. The code may include instructions executable by a processor to output data for a semi-static uplink grant to a UE, the semi-static uplink grant scheduling a set of uplink transmission occasions, the set of uplink transmission occasions including an uplink transmission occasion for a first uplink transmission, output, before a scheduled receive time of the first uplink transmission, data for downlink control information to the UE, the downlink control information including a grant for a second uplink transmission, where the second uplink transmission conflicts with the first uplink transmission, and obtain one of the first uplink transmission or the second uplink transmission received from the UE based on a comparison of a transmit time of the downlink control information and the scheduled receive time of the first uplink transmission.

In some examples of the method, apparatuses, and non-transitory computer-readable medium described herein, obtaining one of the first uplink transmission or the second uplink transmission received from the UE based on the comparison may include operations, features, means, or instructions for determining whether the transmit time of the downlink control information may be within a threshold time before the scheduled receive time of the first uplink transmission, and obtaining one of the first uplink transmission or the second uplink transmission received from the UE based on the determining.

Some examples of the method, apparatuses, and non-transitory computer-readable medium described herein may further include operations, features, means, or instructions for determining that the transmit time of the downlink control information may be within the threshold time before the scheduled receive time of the first uplink transmission, obtaining the first uplink transmission received from the UE based on the determining, and refraining from monitoring for the second uplink transmission based on the determining. Some examples of the method, apparatuses, and non-transitory computer-readable medium described herein may further include operations, features, means, or instructions for determining that the transmit time of the downlink control information may be in advance of the threshold time before the scheduled receive time of the first uplink transmission, obtaining the second uplink transmission received from the UE based on the determining, and refraining from monitoring for the first uplink transmission based on the determining.

Some examples of the method, apparatuses, and non-transitory computer-readable medium described herein may further include operations, features, means, or instructions for determining that an uplink control information transmission overlaps with the first uplink transmission, determining whether the transmit time of the downlink control information may be within another threshold time before a scheduled receive time of the uplink control information transmission, and obtaining one of the first uplink transmission or the second uplink transmission based on the determining. Some examples of the method, apparatuses, and non-transitory computer-readable medium described herein may further include operations, features, means, or instructions for determining that the transmit time of the downlink control information may be within the other threshold time before the scheduled receive time of the uplink control information transmission, obtaining the first uplink transmission received from the UE based on the determining, and refraining from monitoring for the second uplink transmission based on the determining.

Some examples of the method, apparatuses, and non-transitory computer-readable medium described herein may further include operations, features, means, or instructions for determining that the transmit time of the downlink control information may be in advance of the other threshold time before the scheduled receive time of the uplink control information transmission, obtaining the second uplink transmission received from the UE based on the determining, and refraining from monitoring for the first uplink transmission based on the determining. Some examples of the method, apparatuses, and non-transitory computer-readable medium described herein may further include operations, features, means, or instructions for determining that the second uplink transmission conflicts with the first uplink transmission, where the receiving the first uplink transmission or the second uplink transmission may be further based on the determining.

In some examples of the method, apparatuses, and non-transitory computer-readable medium described herein, determining that the second uplink transmission conflicts with the first uplink transmission may include operations, features, means, or instructions for determining that the second uplink transmission and the first uplink transmission may be scheduled on overlapping time resources. In some examples of the method, apparatuses, and non-transitory computer-readable medium described herein, determining that the second uplink transmission conflicts with the first uplink transmission may include operations, features, means, or instructions for determining that a HARQ process ID associated with the second uplink transmission may be the same as the HARQ process ID associated with the first uplink transmission, and determining that a timer for the HARQ process ID associated with the first uplink transmission and the second uplink transmission may be running at a transmit time of the first uplink transmission.

A method for wireless communication at a base station is described. The method may include outputting data for a semi-static uplink grant to a UE, the semi-static uplink grant scheduling a set of uplink transmission occasions, generating downlink control information that includes a grant for a downlink control information grant-based uplink transmission, and outputting data for the downlink control information to transmit to the UE, where a transmit time of the downlink control information is outside of a threshold time before each uplink transmission occasion of the set of uplink transmission occasions.

An apparatus for wireless communication at a base station is described. The apparatus may include a processor, memory in electronic communication with the processor, and instructions stored in the memory. The instructions may be executable by the processor to cause the apparatus to output data for a semi-static uplink grant to a UE, the semi-static uplink grant scheduling a set of uplink transmission occasions, generate downlink control information that includes a grant for a downlink control information grant-based uplink transmission, and output data for the downlink control information to transmit to the UE, where a transmit time of the downlink control information is outside of a threshold time before each uplink transmission occasion of the set of uplink transmission occasions.

Another apparatus for wireless communication at a base station is described. The apparatus may include means for outputting data for a semi-static uplink grant to a UE, the semi-static uplink grant scheduling a set of uplink transmission occasions, generating downlink control information that includes a grant for a downlink control information grant-based uplink transmission, and outputting data for the downlink control information to transmit to the UE, where a transmit time of the downlink control information is outside of a threshold time before each uplink transmission occasion of the set of uplink transmission occasions.

A non-transitory computer-readable medium storing code for wireless communication at a base station is described. The code may include instructions executable by a processor to output data for a semi-static uplink grant to a UE, the semi-static uplink grant scheduling a set of uplink transmission occasions, generate downlink control information that includes a grant for a downlink control information grant-based uplink transmission, and output data for the downlink control information to transmit to the UE, where a transmit time of the downlink control information is outside of a threshold time before each uplink transmission occasion of the set of uplink transmission occasions.

Some examples of the method, apparatuses, and non-transitory computer-readable medium described herein may further include operations, features, means, or instructions for determining that the downlink control information grant-based uplink transmission conflicts with at least one of the set of uplink transmission occasions, and transmitting the downlink control information including the grant for the downlink control information grant-based uplink transmission if the transmit time of the downlink control information may be outside of a threshold time before an earliest uplink transmission occasion with which the DCI grant-based uplink transmission conflicts. Some examples of the method, apparatuses, and non-transitory computer-readable medium described herein may further include operations, features, means, or instructions for receiving the downlink control information grant-based uplink transmission regardless of whether another uplink transmission in an uplink transmission occasion of the set of uplink transmission occasions conflicts with the downlink control information grant-based uplink transmission.

In some examples of the method, apparatuses, and non-transitory computer-readable medium described herein, the threshold time corresponds to a processing time for the UE to process the downlink control information. In some examples of the method, apparatuses, and non-transitory computer-readable medium described herein, the threshold time may be a first threshold time corresponding to a first processing time for determining resources allocated for the uplink transmission based on the downlink control information or a second threshold time corresponding to a second processing time for determining a hybrid automatic repeat request process identifier associated with the uplink transmission based on the downlink control information.

DETAILED DESCRIPTION

Figure 1:
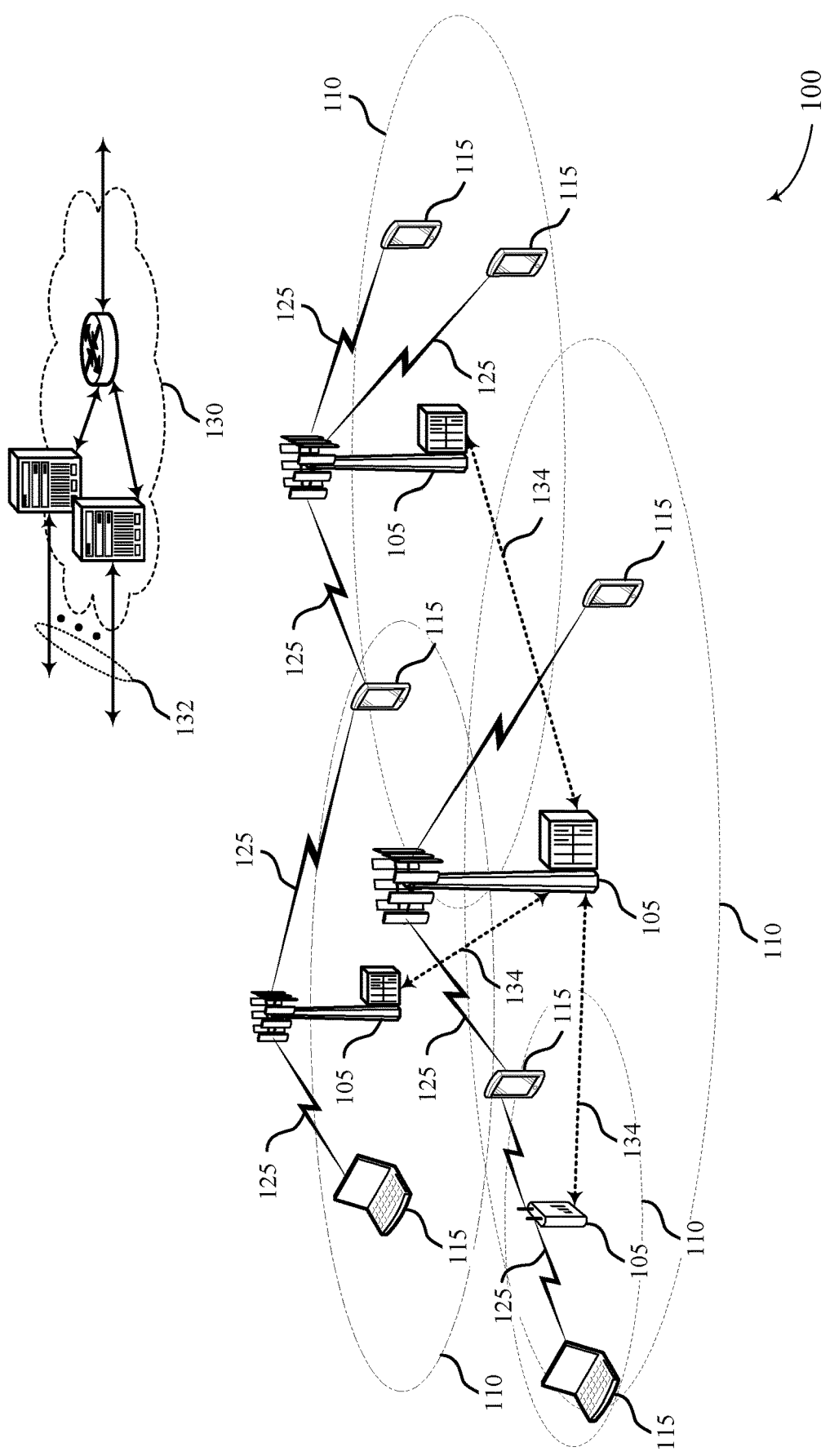
FIG. 1 illustrates an example of a wireless communications system that supports uplink configured grant validation in accordance with aspects of the present disclosure.

In some wireless communications systems, a base station may use semi-static grants and dynamic grants to allocate resources to a user equipment (UE) for uplink transmissions to the base station. Semi-static grants may be transmitted in radio resource control (RRC) signaling and may be referred to as uplink configured grants (ULCGs), and dynamic grants may be transmitted in downlink control information (DCI) and may be referred to as DCI grants. Uplink transmissions corresponding to semi-static grants may be called grantless uplink transmissions, with the word "grantless" referring to the absence of a dynamic grant. In some cases, semi-static grants may also refer to grants for autonomous uplink transmissions. Because semi-static grants may be transmitted less frequently than dynamic grants, the use of semi-static grants may limit overhead in a wireless communications system. In some cases, a base station may schedule conflicting uplink transmissions from a UE using a semi-static grant and a dynamic grant. In conventional systems, however, the UE may not be configured to efficiently handle such cases where the UE is scheduled for conflicting uplink transmissions to a base station, which may result in inefficiencies in a wireless communications system.

As described herein, a UE may support efficient techniques for managing transmissions when the UE is scheduled for conflicting uplink transmissions by different grants. In particular, the UE may support efficient techniques for determining whether to transmit an uplink transmission scheduled by a semi-static grant or a dynamic uplink transmission scheduled by a dynamic grant when the dynamic uplink transmission conflicts with the uplink transmission scheduled by the semi-static grant. Using the techniques described herein, if a UE determines that a dynamic grant is received within a threshold time before an uplink transmission scheduled by a semi-static grant, the UE may transmit the uplink transmission scheduled by the semi-static grant and refrain from transmitting the dynamic transmission. Alternatively, if the UE determines that a dynamic grant is received in advance of a threshold time before an uplink transmission scheduled by a semi-static grant, the UE may transmit the dynamic transmission and refrain from transmitting the uplink transmission scheduled by the semi-static grant.

Particular aspects of the subject matter described herein may be implemented to realize one or more advantages. The described techniques may support improvements in uplink configured grant validation, decreasing signaling overhead, and improving reliability, among other advantages. As such, supported techniques may include improved network operations and, in some examples, may promote network efficiencies, among other benefits.

Aspects of the disclosure introduced above are described herein in the context of a wireless communications system. Examples of processes and signaling exchanges that support uplink configured grant validation are then described. Aspects of the disclosure are further illustrated by and described with reference to apparatus diagrams, system diagrams, and flowcharts that relate to uplink configured grant validation.

FIG. 1 illustrates an example of a wireless communications system 100 that supports uplink configured grant validation in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., on a physical uplink control channel (PUCCH) or a physical uplink shared channel (PUSCH)) or downlink transmissions from a base station 105 to a UE 115 (e.g., on a physical downlink control channel (PDCCH) or a physical downlink shared channel (PDSCH)). In some cases, if a PUCCH containing uplink control information overlaps in time with a PUSCH, a UE 115 may piggyback the uplink control information on the PUSCH and drop the PUCCH. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in a frequency division duplexing (FDD) mode), or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). Each transmission in wireless communications system 100 may be associated with a HARQ process identifier (ID) which may allow a receiving device to combine different transmissions of data associated with the same HARQ process ID. In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a base station 105 may use semi-static grants and dynamic grants to allocate resources to a UE 115 for uplink transmissions to the base station 105. Dynamic grants may be transmitted in DCI and may be referred to as DCI grants. Semi-static grants may be transmitted in RRC signaling and may be referred to as ULCGs. In some cases, different types of semi-static grants may include different information. In one example, a base station 105 may transmit RRC signaling to a UE 115 including a semi-static grant that configures all parameters for PUSCH transmissions (e.g., periodic resources or ULCG occasions with no need to activate an uplink transmission in a ULCG occasion). Alternatively, the base station 105 may transmit RRC signaling to a UE 115 including a semi-static grant that configures a set of transmission parameters (e.g., periodic resources or ULCG occasions), and the transmissions in each ULCG occasion may be activated using DCI which may convey an additional set of parameters. Since semi-static grants may be transmitted less frequently than dynamic grants, the use of semi-static grants may limit overhead in a wireless communications system.

In some cases, a base station 105 may schedule conflicting uplink transmissions from a UE 115 using a semi-static grant and a dynamic grant. For instance, the UE 115 may receive a dynamic grant for an uplink transmission, and the uplink transmission may conflict with another uplink transmission in a ULCG occasion allocated by a semi-static grant. Since a UE 115 may potentially be scheduled for conflicting uplink transmissions, the UE 115 may be configured to determine whether a conflicting dynamic transmission is scheduled before transmitting in a ULCG occasion. For example, the UE 115 may determine whether resources allocated by a dynamic grant for an uplink transmission overlaps with a ULCG occasion before transmitting in the ULCG occasion. Further, the UE 115 may determine whether a timer for a HARQ process ID associated with a transmission in a ULCG occasion is running before transmitting in the ULCG occasion (e.g., if the timer is running for an uplink transmission scheduled by a dynamic grant). If the UE 115 determines that there are no dynamic transmissions conflicting with a ULCG occasion, the UE 115 may transmit in the ULCG occasion.

Figure 2:
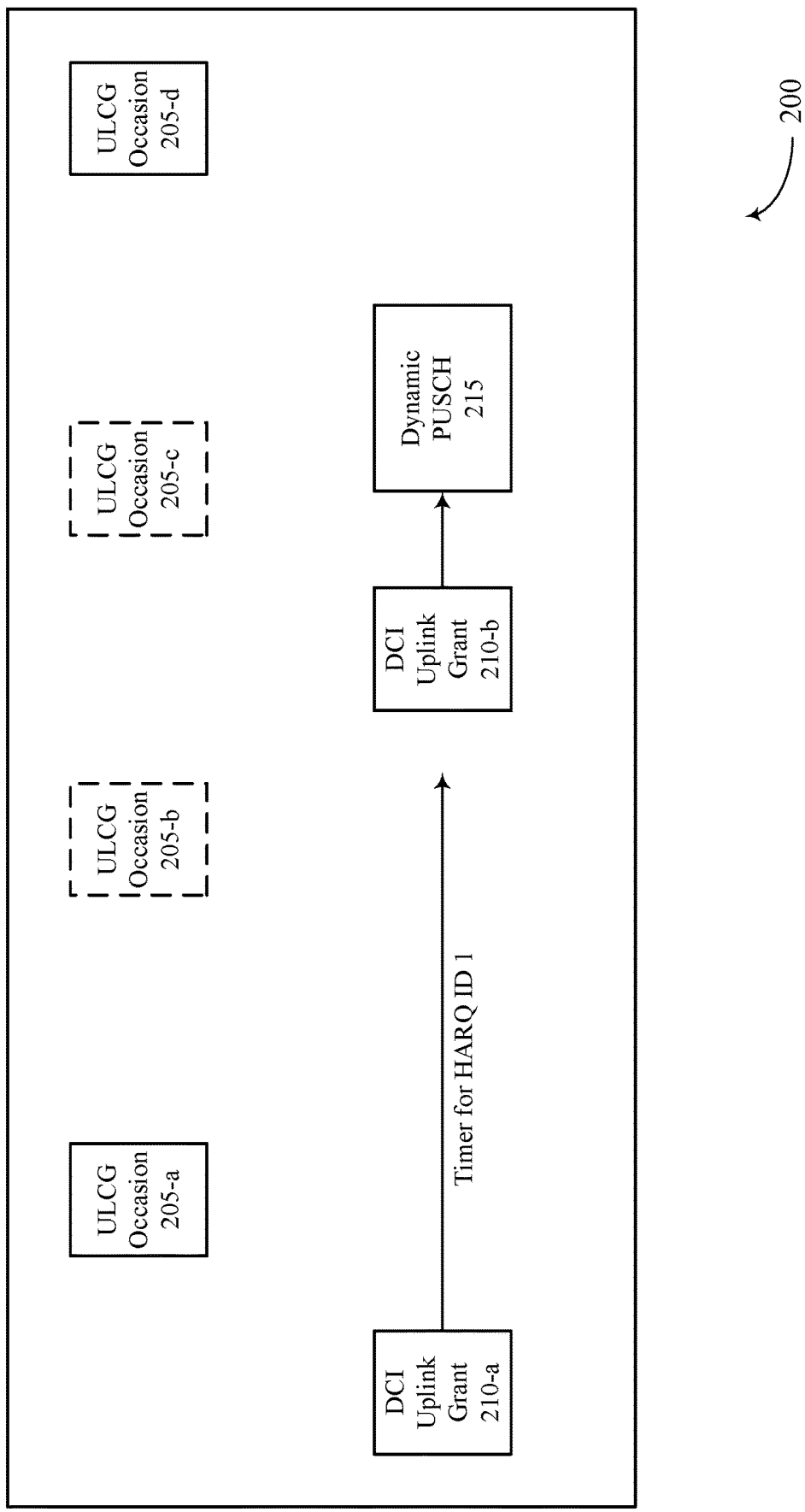
FIG. 2 illustrates an example of conflicting uplink transmissions scheduled by semi-static grants and dynamic grants in accordance with aspects of the present disclosure.

FIG. 2 illustrates an example of conflicting uplink transmissions 200 scheduled by semi-static grants and dynamic grants in accordance with aspects of the present disclosure. In the example of FIG. 2, a UE 115 may receive a semi-static grant allocating resources for uplink transmissions in any of a number of ULCG occasions 205 (e.g., ULCG occasion 205-a, 205-b, 205-c, or 205-d). In one example, the UE 115 may also receive a DCI uplink grant 210-a (i.e., a dynamic grant) allocating resources for an uplink transmission associated with a HARQ process ID 1. Once the DCI uplink grant 210-a is received, the UE 115 may initiate a timer for HARQ process ID 1 to ensure that no other data associated with a HARQ process ID of 1 is transmitted. However, an uplink transmission in ULCG occasion 205-b, for example, may also be associated with HARQ process ID 1 (e.g., where each ULCG occasion is associated with a HARQ process ID that is determined based on a symbol or slot index of the resources allocation of the ULCG occasion), and the timer for HARQ process ID 1 may be running at the scheduled transmit time of the uplink transmission in the ULCG occasion 205-b. Thus, the UE 115 may determine that the uplink transmission scheduled by DCI uplink grant 210-a conflicts with the uplink transmission in ULCG occasion 205-b, and the UE 115 may refrain from transmitting in the ULCG occasion 205-b. In another example, the UE 115 may also receive a DCI uplink grant 210-b that allocates resources for a dynamic PUSCH transmission 215. However, the dynamic PUSCH transmission 215 may overlap in time with a ULCG occasion 205-c, for example. Thus, the UE 115 may determine that the uplink transmission scheduled by DCI uplink grant 210-b conflicts with an uplink transmission in ULCG occasion 205-c, and the UE 115 may refrain from transmitting in the ULCG occasion 205-c.

Using the above techniques, in certain instances, a UE 115 may be able to determine whether to cancel an uplink transmission in a ULCG occasion. That is, the UE 115 may cancel an uplink transmission in a ULCG occasion (i.e., invalidate a ULCG occasion) if the UE 115 receives a grant scheduling another uplink transmission that conflicts with the uplink transmission in the ULCG occasion. Further, the UE 115 may transmit in a ULCG occasion (i.e., validate a ULCG occasion) if the UE 115 determines that there are no other uplink transmissions that conflict with the uplink transmission in the ULCG occasion.

In some cases, however, the conditions for determining whether to transmit in a ULCG occasion may be changing dynamically. That is, a UE 115 may determine to transmit in a ULCG occasion (i.e., to validate a ULCG occasion) in one instance, and, in another instance (e.g., after conditions change), the UE 115 may determine to refrain from transmitting in the ULCG occasion (i.e., to invalidate the ULCG occasion). For example, the UE 115 may receive a very late dynamic grant that schedules an uplink transmission on resources that overlap with a ULCG occasion, or the UE 115 may receive a very late dynamic grant that schedules an uplink transmission associated with the same HARQ process ID as a transmission scheduled in a ULCG occasion (i.e., such that the timer for the HARQ process ID would be running at the time of the uplink transmission in the ULCG occasion).

In conventional systems, a UE 115 may not be configured to handle such cases where the UE 115 is scheduled for an uplink transmission in a ULCG occasion, and the conditions for determining whether to transmit in the ULCG occasion may be changing dynamically. For instance, since the UE 115 may receive a late dynamic grant that schedules an uplink transmission that conflicts with an uplink transmission in ULCG occasion, the UE 115 may not have sufficient time to process the dynamic grant before the uplink transmission in the ULCG occasion. Thus, the UE 115 may not be able to determine whether to transmit in the ULCG occasion, and there may be a mis-alignment between UE behavior (e.g., transmissions from the UE 115) and the expectations of the base station (e.g., what the base station 105 expects to receive). As described herein, a UE 115 may support efficient techniques for determining whether to transmit in a ULCG occasion when the UE 115 receives a dynamic grant scheduling an uplink transmission that conflicts with a scheduled uplink transmission in the ULCG occasion (e.g., regardless of when the UE 115 receives the dynamic grant).

Figure 3:
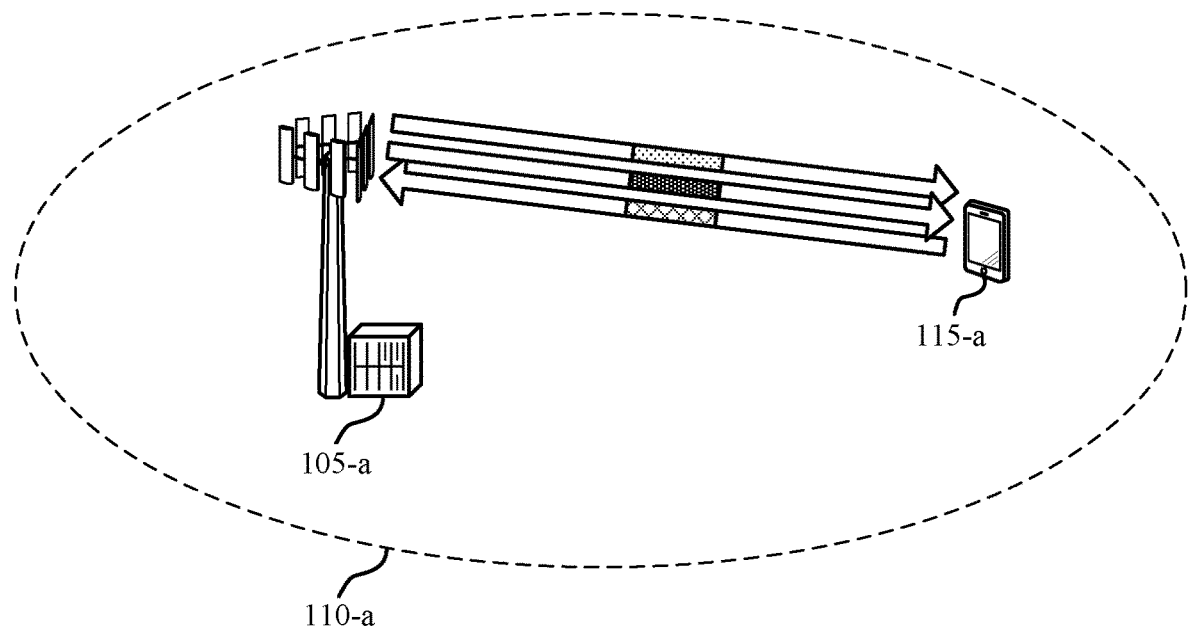
FIG. 3 illustrates an example of a wireless communications system that supports uplink configured grant validation in accordance with aspects of the present disclosure.

FIG. 3 illustrates an example of a wireless communications system 300 that supports uplink configured grant validation in accordance with aspects of the present disclosure. Wireless communications system 300 includes base station 105-a, which may be an example of a base station 105 described with reference to FIG. 1. Wireless communications system 300 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Wireless communications system 300 may implement aspects of wireless communications system 100. For example, UE 115-a in wireless communications system 300 may support efficient techniques for determining whether to transmit in a ULCG occasion when the UE 115 receives a dynamic grant scheduling an uplink transmission that conflicts with a scheduled uplink transmission in the ULCG occasion (i.e., regardless of when the UE 115 receives the dynamic grant).

In the example of FIG. 3, UE 115-a may receive a semi-static uplink grant 305 allocating a number of ULCG occasions (i.e., periodic resources) for uplink transmissions to base station 105-a. UE 115-a may then receive a dynamic grant 310 scheduling a dynamic transmission to base station 105-a, and the dynamic transmission may conflict with a transmission on one of the ULCG occasions. Thus, using the techniques described herein, UE 115-a may determine whether to transmit (e.g., uplink data 315) in the ULCG occasion or transmit the dynamic uplink transmission based on when the dynamic grant 310 was received. If UE 115-a determines that the dynamic grant 310 was received within a threshold time before the transmit time of the transmission in the ULCG occasion, the UE may transmit in the ULCG occasion and refrain from transmitting the dynamic transmission. Alternatively, if UE 115-a determines that a dynamic grant 310 was received in advance of a threshold time before the transmit time of the transmission in the ULCG occasion, the UE may transmit the dynamic transmission and refrain from transmitting in the ULCG occasion.

Using these techniques, UE 115-a may be able to determine whether to transmit in a ULCG occasion or transmit a dynamic transmission that conflicts with the ULCG transmission. As can be understood from the timeline of procedures at UE 115-a, if a dynamic grant for a dynamic transmission is received within the threshold time before the scheduled transmit time of a transmission in a ULCG occasion, the UE 115-a may not be able to determine whether the dynamic transmission overlaps with the transmission in the ULCG occasion (i.e., since the UE 115-a may not have enough time to process the dynamic grant before the transmission in the ULCG occasion). As such, by transmitting in the ULCG occasion (e.g., as opposed to refraining from transmitting in the ULCG occasion due to the possibility that the dynamic transmission may overlap with the ULCG occasion), the UE 115-a may avoid missing a transmission opportunity in the event that the dynamic transmission does not conflict with the transmission in the ULCG occasion (i.e., the UE 115-a may transmit in the ULCG occasion and transmit the dynamic transmission if there is no conflict). Thus, the techniques described herein may allow UE 115-a to maximize uplink throughput.

In some cases, obtaining a semi-static uplink grant received from a base station, the semi-static uplink grant scheduling a plurality of uplink transmission occasions, the plurality of uplink transmission occasions including an uplink transmission occasion for a first uplink transmission; obtaining, before one of a plurality of uplink transmission occasions corresponding to the semi-static grant, DCI received from the base station, the DCI including a grant for a second uplink transmission, wherein the second uplink transmission conflicts with the first uplink transmission; and outputting data for one of the first uplink transmission or the second uplink transmission based at least in part on a comparison of a receive time of the DCI and the scheduled transmit time of the first uplink transmission may increase the efficiency (e.g., increase throughput, facilitate alignment and predictability, etc.) of communications between UE 115-a and base station 105-a. For instance, as described herein, UE 115-a may determine to transmit the first uplink transmission even before UE 115-a determines that the second uplink transmission conflicts with the first uplink transmission. As such, the UE 115-a may not miss the opportunity to transmit the first uplink transmission if the UE 115-a determines that the second uplink transmission does not conflict with the first uplink transmission. Further, using these techniques, UE 115-a may be able to determine whether to transmit the first uplink transmission or the second uplink transmission, and receiving base station 105-a may be able to determine whether the first uplink transmission or the second uplink transmission is being received (i.e., there may be alignment between the UE behavior and what the base station expects).

Figure 4:
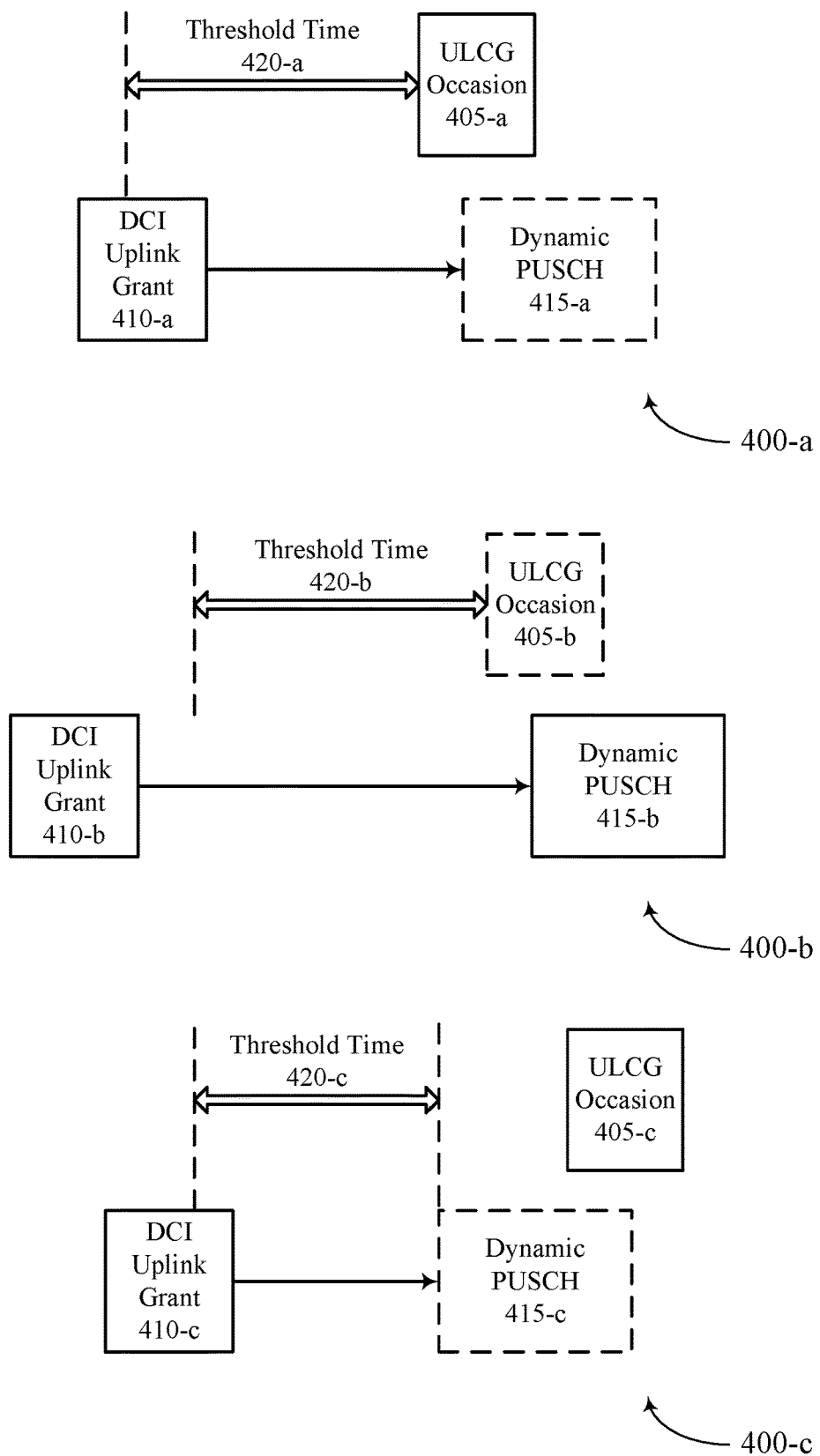
FIGS. 4-6 illustrate example timelines of communications between a base station and a user equipment (UE) in accordance with aspects of the present disclosure.

FIG. 4 illustrates example timelines 400 of communications between a base station 105 and a UE 115 in accordance with aspects of the present disclosure. In the example of FIG. 4, a base station 105 may transmit a semi-static grant to a UE 115 allocating a number of ULCG occasions for uplink transmissions from the UE 115 to the base station 105. The base station 105 may then transmit a DCI uplink grant 410 scheduling a dynamic PUSCH transmission 415. However, the dynamic PUSCH transmission 415 may conflict with a transmission in a ULCG occasion 405 of the allocated ULCG occasions. In particular, the resources allocated for the dynamic PUSCH transmission 415 and the resources of the ULCG occasion 405 may overlap in the time domain. Thus, the UE 115 may use the techniques described herein to determine whether to transmit in the ULCG occasion 405 or transmit the dynamic PUSCH 415.

In example timeline 400-a, the UE 115 may determine that the DCI uplink grant 410-a is received within a threshold time 420-a before the ULCG occasion 405-a. That is, the UE 115 may determine that at least one symbol on which the DCI uplink grant 410-a is received falls within the threshold time 420-a before the ULCG occasion 405-a. Thus, in this example, the UE 115 may transmit in the ULCG occasion 405-a (i.e., validate the ULCG occasion 405-a) and refrain from transmitting the dynamic PUSCH 415-a. In some cases, the UE 115 may only transmit in the ULCG occasion 405-a and refrain from transmitting the dynamic PUSCH 415-a if the UE 115 has data to transmit in the ULCG occasion 405-a (e.g., if there is new data in the MAC buffer to be transmitted in the ULCG occasion 405-a). Otherwise, if the UE 115 does not have data to transmit in the ULCG occasion 405-a, the UE 115 may refrain from transmitting in the ULCG occasion 405-a and may transmit the dynamic PUSCH 415-*a* (e.g., even though the DCI uplink grant 410-*a* is received within the threshold time 420-*a* before the ULCG occasion 405-*a*).

In example timeline 400-*b*, the UE 115 may determine that the DCI uplink grant 410-*b* is received in advance of a threshold time 420-*b* before the ULCG occasion 405-*b*. That is, the UE 115 may determine that no symbols on which the DCI uplink grant 410-*b* is received falls within the threshold time 420-*b* before the ULCG occasion 405-*b*. Thus, in this example, the UE 115 may transmit the dynamic PUSCH 415-*b* and refrain from transmitting in the ULCG occasion 405-*b* (i.e., invalidate the ULCG occasion 405-*b*). In the examples described herein, the threshold time 420 may correspond to a time expected to be taken by the UE 115 to process the DCI uplink grant 410 (i.e., a DCI processing time) and to prepare the uplink transmission in the ULCG occasion 405. For instance, the threshold time 420 may be equal to (or slightly less than) N2, which corresponds to the number of OFDM symbols required for UE processing from the end of the PDCCH containing the DCI uplink grant 410 to the earliest possible start of the dynamic PUSCH 415 transmission (i.e., the corresponding PUSCH transmission) from the UE perspective. Alternatively, the threshold time 420 may correspond to a time expected to be taken by the UE 115 to determine whether the dynamic PUSCH 415 conflicts with the ULCG occasion 405 in the above examples (e.g., which may correspond to the DCI processing time). In some examples, the threshold time 420 may be longer than a time period required for decoding the DCI at the UE and determining the dynamic UL grant has been received.

In some aspects, the reference point for the threshold time 420 (i.e., the point before which the threshold time 420 is measured) may be the earlier scheduled transmit time of the scheduled transmit time of the transmission in the ULCG occasion 405 and the scheduled transmit time of the dynamic PUSCH 415. In example timelines 400-*a* and 400-*b*, the ULCG occasions 405 may precede the dynamic PUSCHs 415, and the threshold times 420 may be measured from the ULCG occasions 405 (i.e., the reference point in each timeline is the starting time or starting symbol of the respective ULCG occasion 405). In example timeline 400-*c*, however, the dynamic PUSCH 415-*c* may precede the ULCG occasion 405-*c*. Thus, the threshold time 420-*c* may be measured from the dynamic PUSCH 415-*c* (i.e., the reference point is the starting time or starting symbol of the dynamic PUSCH 415-*c*). That is, UE 115 may determine whether to transmit in the ULCG occasion 405-*c* or transmit the dynamic PUSCH 415-*c* based on whether UE 115 determines that the DCI uplink grant 410-*c* is received within the threshold time 420-*c* before the dynamic PUSCH 415-*c*. In this example, the UE 115 may determine that the DCI uplink grant 410-*c* is received within the threshold time 420-*c* before the dynamic PUSCH 415-*c* (e.g., the UE 115 may not be able to finish processing the DCI uplink grant 410-*c* before the dynamic PUSCH 415-*c*). As such, the UE 115 may transmit in the ULCG occasion 405-*c* (i.e., validate the ULCG occasion 405-*c*) and refrain from transmitting the dynamic PUSCH 415-*c*.

Figure 5:
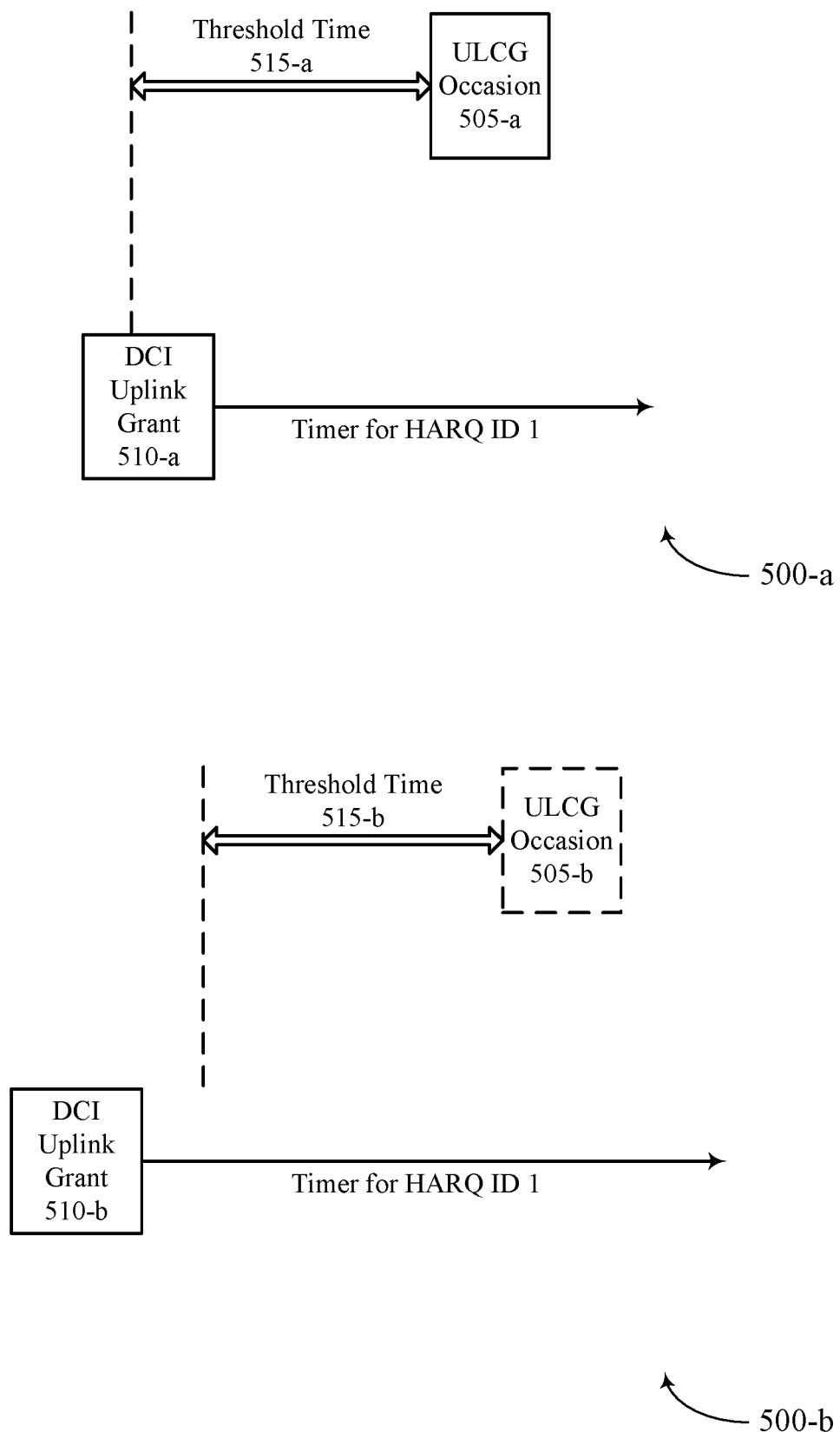

FIG. 5 illustrates example timelines 500 of communications between a base station 105 and a UE 115 in accordance with aspects of the present disclosure. In the example of FIG. 5, a base station 105 may transmit a semi-static grant to a UE 115 allocating a number of ULCG occasions for uplink transmissions from the UE 115 to the base station 105. The base station 105 may then transmit a DCI uplink grant 510 scheduling a dynamic transmission (not shown) associated with a particular HARQ process ID (e.g., HARQ process ID 1). However, the dynamic transmission may conflict with a transmission in a ULCG occasion 505 of the allocated ULCG occasions. In particular, the HARQ process ID of the dynamic transmission may be the same as the HARQ process ID for the transmission in the ULCG occasion 505, and a timer for the HARQ process ID may be running at the transmit time of the transmission in the ULCG occasion 505 (e.g., since the timer may be initiated or reinitiated once the DCI uplink grant 510 for the dynamic transmission is received). Thus, the UE 115 may use the techniques described herein to determine whether to transmit in the ULCG occasion 505 or transmit the dynamic transmission.

In example timeline 500-*a*, the UE 115 may determine that the DCI uplink grant 510-*a* is received within a threshold time 515-*a* before the ULCG occasion 505-*a*. That is, the UE 115 may determine that at least one symbol on which the DCI uplink grant 510-*a* is received falls within the threshold time 515-*a* before the ULCG occasion 505-*a*. Thus, in this example, the UE 115 may transmit in the ULCG occasion 505-*a* (i.e., validate the ULCG occasion 505-*a*) and refrain from transmitting the dynamic transmission scheduled by the DCI uplink grant 510-*a*. In some cases, the UE 115 may only transmit in the ULCG occasion 505-*a* and refrain from transmitting the dynamic transmission if the UE 115 has data to transmit in the ULCG occasion 505-*a* (e.g., if there is new data in the MAC buffer to be transmitted in the ULCG occasion 505-*a*). Otherwise, if the UE 115 does not have data to transmit in the ULCG occasion 505-*a*, the UE 115 may refrain from transmitting in the ULCG occasion 505-*a* and transmit the dynamic transmission (e.g., even though the DCI uplink grant 510-*a* is received within the threshold time 515-*a* before the ULCG occasion 505-*a*).

In example timeline 500-*b*, the UE 115 may determine that the DCI uplink grant 510-*b* is received in advance of a threshold time 515-*b* before the ULCG occasion 505-*b*. That is, the UE 115 may determine that no symbols on which the DCI uplink grant 510-*b* is received falls within the threshold time 515-*b* before the ULCG occasion 505-*b*. Thus, in this example, the UE 115 may transmit the dynamic transmission scheduled by the DCI uplink grant 510-*b* and refrain from transmitting in the ULCG occasion 505-*b* (i.e., invalidate the ULCG occasion 505-*b*). In the examples described herein, the threshold time 515 may correspond to a time expected to be taken by the UE 115 to process the DCI uplink grant 510 (i.e., a DCI processing time) and to prepare the uplink transmission in the ULCG occasion 505. For instance, the threshold time 515 may be equal to (or slightly less than) N2, which corresponds to the number of OFDM symbols required for UE processing from the end of the PDCCH containing the DCI uplink grant 510 to the earliest possible start of the dynamic transmission scheduled by the DCI uplink grant 510 (i.e., the corresponding PUSCH transmission) from the UE perspective. Alternatively, the threshold time 520 may correspond to a time expected to be taken by the UE 115 to determine whether the dynamic transmission conflicts with the ULCG occasion 505 in the above examples (e.g., which may correspond to the DCI processing time). In some cases, the threshold time 515 (T2) which may correspond to a processing time for determining whether a HARQ timer for a HARQ process ID associated with a transmission in a ULCG occasion 505 is running at the time of the transmission in the ULCG occasion 505 (i.e., whether there is a HARQ conflict with a dynamic transmission) may be different from the threshold time 420 (T1) which may correspond to a processing time for determining whether a transmission in a ULCG occasion 405 and a dynamic transmission overlaps in a time domain.

Figure 6:
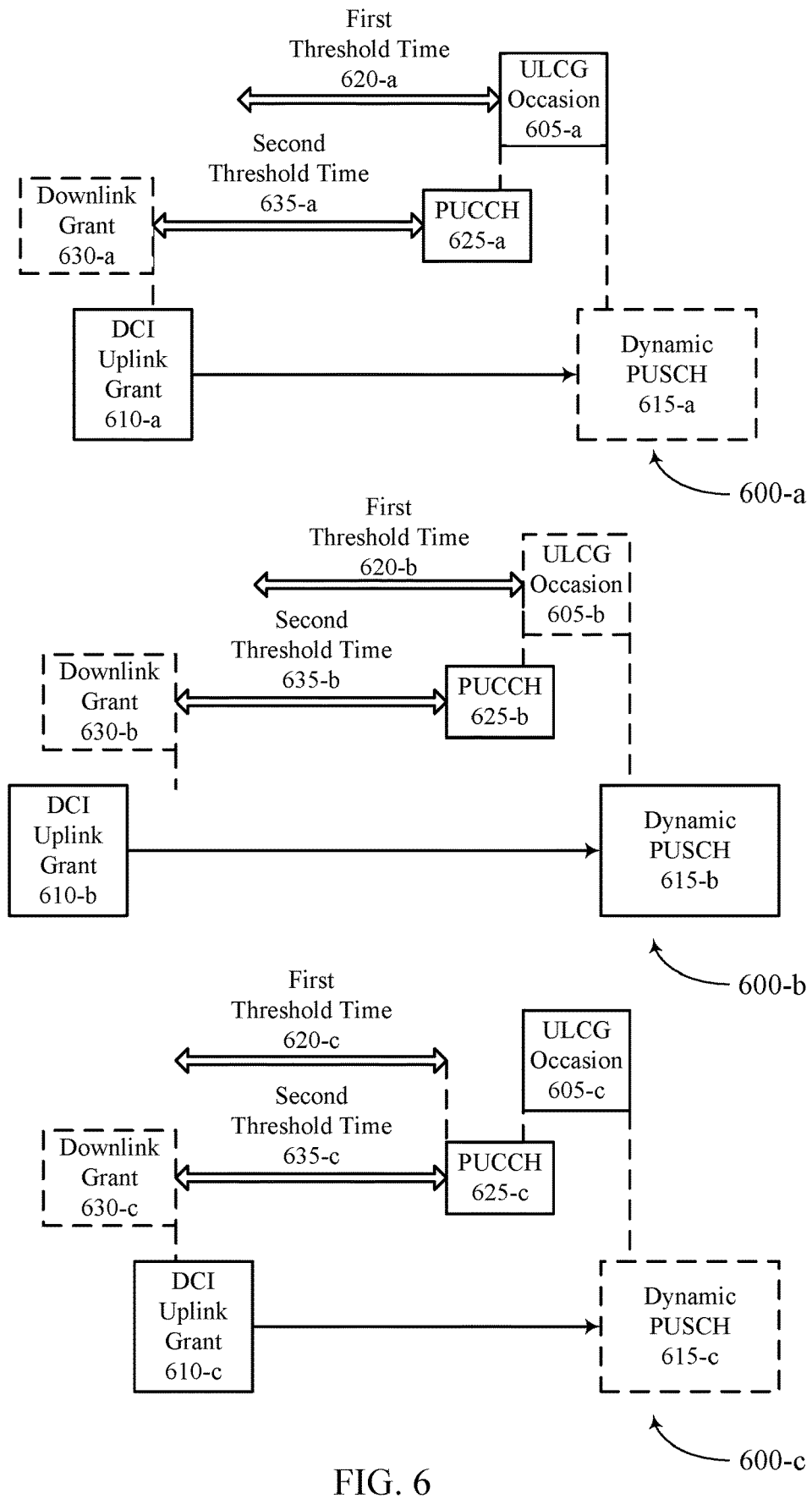

FIG. 6 illustrates example timelines 600 of communications between a base station 105 and a UE 115 in accordance with aspects of the present disclosure. In the example of FIG. 6, a base station 105 may transmit a semi-static grant to a UE 115 allocating a number of ULCG occasions for uplink transmissions from the UE 115 to the base station 105. The base station 105 may also transmit an uplink grant 630 (e.g., uplink grant 630-a, 630-b, or 630-c) to schedule a PUCCH transmission 625, where the PUCCH transmission 625 may overlap with a ULCG occasion 605 of the allocated ULCG occasions. The base station 105 may then transmit a DCI uplink grant 610 scheduling a dynamic PUSCH transmission 615. However, the dynamic PUSCH transmission 615 may conflict with a transmission in a ULCG occasion 605 of the allocated ULCG occasions. Specifically, in this example, the resources allocated for the dynamic PUSCH transmission 615 and the resources of the ULCG occasion 605 may overlap in the time domain.

Since the dynamic PUSCH transmission 615 may conflict with a transmission in a ULCG occasion 605 of the allocated ULCG occasions, it may be appropriate to determine whether to transmit uplink data in the ULCG occasion 605 in addition to uplink control information from the PUCCH piggybacked on the data transmission in the ULCG occasion 605 or to transmit the PUCCH 625 and dynamic PUSCH 615. However, it may not be sufficient to determine whether to transmit the uplink data and control information in the ULCG occasion 605 or transmit the PUCCH 625 and the dynamic PUSCH 615 based on whether a receive time of the DCI uplink grant 610-a is within a first threshold time 620 of a ULCG occasion. Specifically, if the receive time of the DCI uplink grant 610 is too close to the transmit time of the PUCCH transmission 625, the UE 115 may not be able to process the DCI uplink grant 610 before the PUCCH transmission 625. As a result, the UE 115 may not be able to determine whether to transmit the uplink data and control information in the ULCG occasion 605 or transmit the PUCCH 625 and the dynamic PUSCH 615 based on only the first threshold time 620. As described herein, a UE 115 may support efficient techniques for determining whether to transmit the uplink data and control information in the ULCG occasion 605 or transmit the PUCCH 625 and the dynamic PUSCH 615 based on a second threshold time 635.

In the example timeline 600-a, the UE 115 may determine that the DCI uplink grant 610-a is received in advance of a first threshold time 620-a before the ULCG occasion 605-a. However, the UE 115 may determine that the DCI uplink grant 610-a is received within a second threshold time 635-a before PUCCH transmission 625-a. That is, the UE 115 may determine that at least one symbol on which the DCI uplink grant 610-a is received falls within the threshold time 635-a before the PUCCH transmission 625-a. Thus, in this example, the UE 115 may transmit the uplink data and control information (i.e., from the PUCCH 625-a) in the ULCG occasion 605-a (i.e., validate the ULCG occasion 605-a) and refrain from transmitting the dynamic PUSCH 615-a. In some cases, the UE 115 may only transmit in the ULCG occasion 605-a and refrain from transmitting the dynamic PUSCH 615-a if the UE 115 has data to transmit in the ULCG occasion 605-a (e.g., if there is new data in the MAC buffer to be transmitted in the ULCG occasion 605-a). Otherwise, if the UE 115 does not have data to transmit in the ULCG occasion 605-a, the UE 115 may refrain from transmitting in the ULCG occasion 605-a and may transmit the PUCCH 625-a (e.g., on the allocated resources rather than in the ULCG occasion 605-a) and the dynamic PUSCH 615-a (e.g., even though the DCI uplink grant 610-a is received within the threshold time 635-a before the PUCCH transmission 625-a).

In example timeline 600-b, the UE 115 may determine that the DCI uplink grant 610-b is received in advance of a first threshold time 620-b before the ULCG occasion 605-b and in advance of a second threshold time 635-b before PUCCH transmission 625-b. That is, the UE 115 may determine that no symbols on which the DCI uplink grant 610-b is received falls within the threshold time 620-b before the ULCG occasion 605-b or within the threshold time 635-b before PUCCH transmission 625-b. Thus, in this example, the UE 115 may transmit the PUCCH 625-b and the dynamic PUSCH 615-b and may refrain from transmitting the uplink data and control information (i.e., from the PUCCH 625-a) in the ULCG occasion 605-b (i.e., the UE 115 may invalidate the ULCG occasion 605-b).

Figure 7:
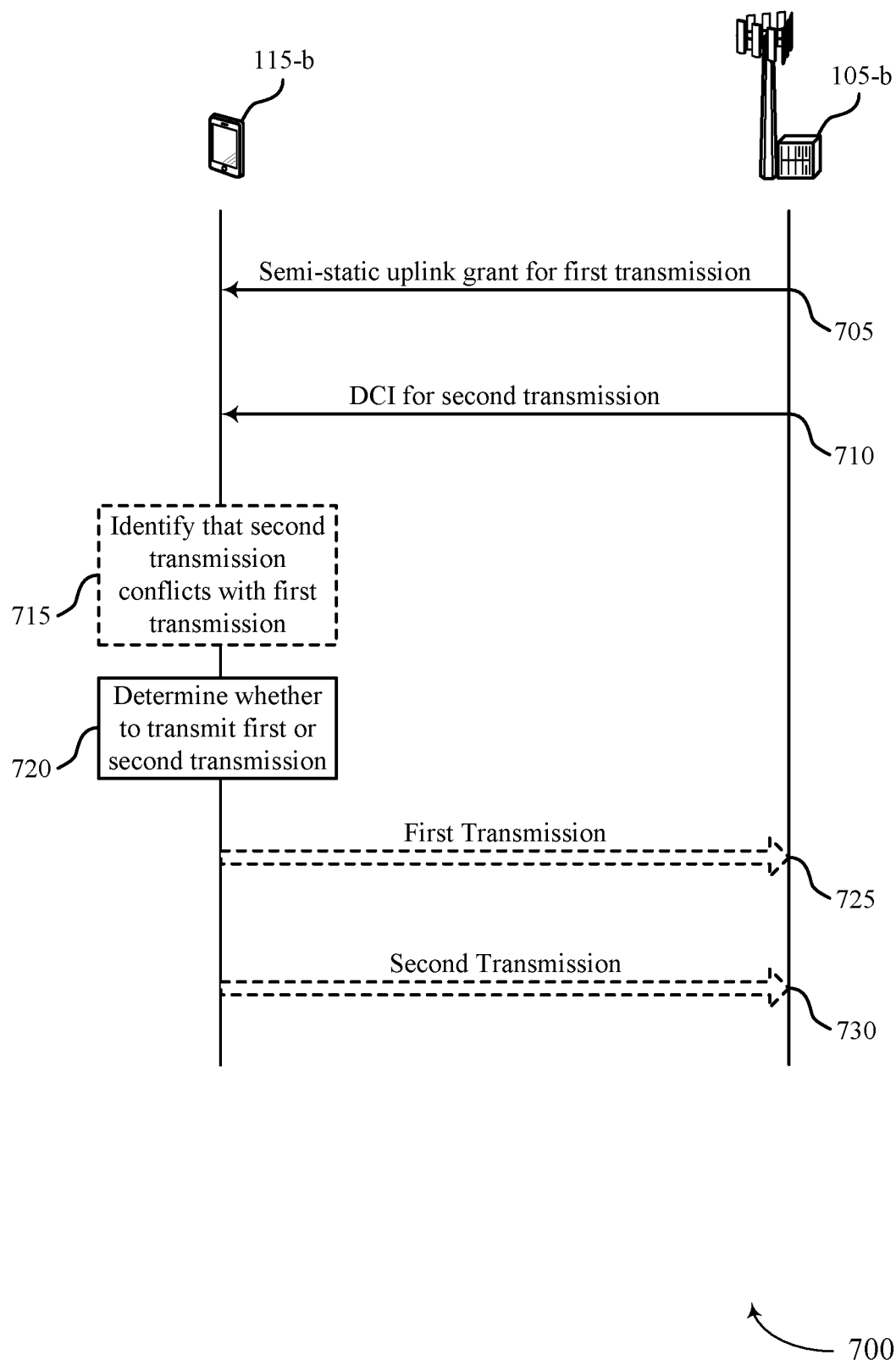
FIG. 7 illustrates an example of a process flow that supports uplink configured grant validation in accordance with aspects of the present disclosure.

In some aspects, the reference point for the threshold time 620 (i.e., the point before which the threshold time 620 is measured) may be the earlier scheduled transmit time of the scheduled transmit time of the transmission in the ULCG occasion 605, the scheduled transmit time of the dynamic PUSCH 615, and the scheduled transmit time of the PUCCH 625. Accordingly, in example timeline 600-c, because the PUCCH 625-c may precede the ULCG occasion 605-c and the dynamic PUSCH 615-c, the threshold time 620-c may be measured from the PUCCH 625-c (i.e., the reference point is the starting time of the PUCCH 625-c). That is, UE 115 may determine whether to transmit the uplink data and control information in the ULCG occasion 605-c or transmit the PUCCH 625-c and the dynamic PUSCH 615-c based on whether the DCI uplink grant 610-c is received within the threshold time 620-c before the PUCCH 625-c and the threshold time 635-c. In this example, the UE 115 may determine that the DCI uplink grant 610-c is received within the threshold time 620-c before the PUCCH 625-c and the threshold time 635-c. As such, the UE 115 may transmit the uplink data and control information in the ULCG occasion 605-c (i.e., validate the ULCG occasion 605-c) and refrain from transmitting the PUCCH 625-c (i.e., on all of the allocated PUCCH resources) and the dynamic PUSCH 615-c FIG. 7 illustrates an example of a process flow 700 that supports uplink configured grant validation in accordance with aspects of the present disclosure. Process flow 700 illustrates aspects of techniques performed by a base station 105-b, which may be an example of a base station 105 described with reference to FIGS. 1-6. Process flow 700 also illustrates aspects of techniques performed by UE 115-b, which may be an example of a UE 115 described with reference to FIGS. 1-6. Process flow 700 may implement aspects of wireless communications system 100. For example, UE 115-b may support efficient techniques for determining whether to transmit in a ULCG occasion when UE 115-b receives a dynamic grant scheduling an uplink transmission that conflicts with a scheduled uplink transmission in the ULCG occasion (i.e., regardless of when the UE 115-b receives the dynamic grant).

At 705, base station 105-b may transmit a semi-static uplink grant to UE 115-b, the semi-static uplink grant scheduling a set of uplink transmission occasions (or ULCG occasions), where the set of uplink transmission occasions includes an uplink transmission occasion for a first uplink transmission. At 710, base station 105-b may then transmit, before one of the uplink transmission occasions corresponding to the semi-static uplink grant, DCI including a grant for a second uplink transmission, where the second uplink transmission conflicts with the first uplink transmission. At 715, UE 115-*b* may then (optionally) identify that the second uplink transmission conflicts with the first uplink transmission. In one example, the second uplink transmission may conflict with the first uplink transmission if the second uplink transmission and the first uplink transmission are scheduled on overlapping time resources. In another example, the second uplink transmission may conflict with the first uplink transmission if the second uplink transmission and the first uplink transmission are associated with the same HARQ process ID, and the timer for the HARQ process ID is running at the transmit time of the first uplink transmission (e.g., where the HARQ timer may be initiated when the DCI for the second uplink transmission is received).

At 720, UE 115-*b* may determine whether to transmit the first uplink transmission or the second uplink transmission based on a comparison of the receive time of the DCI and a scheduled transmit time of the first uplink transmission. For instance, UE 115-*b* may determine whether to transmit the first uplink transmission or the second uplink transmission based on whether the receive time of the DCI is within a threshold time before the scheduled transmit time of the first uplink transmission. If UE 115-*b* determines that the receive time of the DCI is within the threshold time before the scheduled transmit time of the first uplink transmission, UE 115-*b* may transmit the first uplink transmission at 725 and refrain from transmitting the second uplink transmission at 730. Alternatively, if UE 115-*b* determines that the receive time of the DCI is in advance of the threshold time before the scheduled transmit time of the first uplink transmission, UE 115-*b* may transmit the second uplink transmission at 730 and refrain from transmitting the first uplink transmission at 725.

In one example, the threshold time (T) described above may correspond to a time expected to be taken by UE 115-*b* to process the DCI received at 710 (e.g., where UE 115-*b* may not be expected to transmit a PUSCH transmission scheduled by DCI if the network schedules the PUSCH transmission without allowing sufficient time for DCI processing). In another example, the threshold time (T) may be set to any of a number of threshold times each corresponding to a processing time for determining whether the first uplink transmission conflicts with a second uplink transmission. For instance, the threshold time (T) may be a first threshold time (T1) corresponding to a first processing time or a second threshold time (T2) corresponding to a second processing time. The first processing time may be for determining whether the first uplink transmission and the second uplink transmission are scheduled on overlapping time resources (i.e., a processing time for determining resources allocated for the second uplink transmission based on the DCI). Further, the second processing time may be for determining whether the first uplink transmission and the second uplink transmission are associated with the same HARQ process ID and determining that a timer for the HARQ process ID would be running at the transmit time of the first uplink transmission (i.e., a processing time for determining a HARQ process ID associated with the second uplink transmission based on the DCI).

In this example, the first threshold time (T1) or second threshold time (T2) may be zero, in which case, no processing time constraint is set for checking that condition. In either example, the threshold time (T, T1, T2, etc.) may correspond to a capability of UE 115-*b*. In some cases, the threshold time may be configured or stored at the UE 115-*b* (e.g., based on UE capability and/or other factors). In other cases, base station 105-*b* may transmit the threshold time to UE 115-*b* in an RRC configuration. In yet other cases, base station 105-*b* may broadcast the threshold time to UE 115-*b* and other UEs 115 (e.g., in a system information block (SIB)).

In some cases, the UE 115-*b* may also be scheduled to transmit uplink control information to base station 105-*b* in a PUCCH, where the PUCCH transmission may overlap with the first uplink transmission. In such cases, UE 115-*b* may determine whether to transmit the first uplink transmission with the uplink control information piggybacked on the first uplink transmission or transmit the second uplink transmission in addition to a separate uplink control information transmission in the PUCCH based on a comparison of the receive time of the DCI and a scheduled transmit time of the uplink control information transmission (i.e., based on whether the receive time of the DCI is within another threshold time before the scheduled transmit time of the uplink control information transmission). If UE 115-*b* determines that the receive time of the DCI is within the other threshold time before the scheduled transmit time of the uplink control information transmission, UE 115-*b* may transmit the first uplink transmission at 725 with the uplink control information piggybacked on the first uplink transmission. Alternatively, if UE 115-*b* determines that the receive time of the DCI is in advance of the threshold time before the scheduled transmit time of the uplink control information transmission, UE 115-*b* may transmit the second uplink transmission at 730 in addition to a separate uplink control information transmission in the PUCCH.

In some cases, the decision on whether to transmit the first uplink transmission may be further based on whether UE 115-*b* has data to transmit in the first uplink transmission. That is, UE 115-*b* may determine whether to transmit the first uplink transmission or the second uplink transmission based on a comparison of the receive time of the DCI and a scheduled transmit time of the first uplink transmission and based on whether the UE 115-*b* has data to transmit in the first uplink transmission. For instance, UE 115-*b* may determine that the receive time of the DCI is within the threshold time before the scheduled transmit time of the first uplink transmission and within another threshold time before a scheduled uplink control information transmission if the uplink control information transmission overlaps with the first uplink transmission. Accordingly, if UE 115-*b* identifies data to transmit in the first uplink transmission, UE 115-*b* may transmit the first uplink transmission at 725 and refrain from transmitting the second uplink transmission at 730. Alternatively, if UE 115-*b* fails to identify data to transmit in the first uplink transmission, UE 115-*b* may transmit the second uplink transmission at 730 and refrain from transmitting the first uplink transmission at 725.

Using the techniques described herein, UE 115-*b* may be equipped to determine whether to transmit the first uplink transmission or the second uplink transmission (i.e., when the second uplink transmission conflicts with the first uplink transmission) regardless of when the DCI for the second uplink transmission is received. In particular, UE 115-*b* may be able to determine whether to transmit the first uplink transmission or the second uplink transmission if the DCI for the second uplink transmission is received within a threshold time prior to the first uplink transmission or in advance of the threshold time prior to the first uplink transmission.

In some cases, however, to limit the complexity at UE 115-*b*, base station 105-*b* may refrain from transmitting DCI for the second uplink transmission within the threshold time prior to the first uplink transmission. In particular, if base station 105-*b* determines that a DCI grant-based uplink transmission conflicts with a transmission in a ULCG occasion, base station 105-*b* may transmit the DCI including the grant for the DCI grant-based uplink transmission if the transmit time of the DCI is outside of a threshold time (e.g., preceding or not within the threshold time) before an earliest ULCG occasion with which the DCI grant-based uplink transmission conflicts. In such cases, base station 105-*b* may receive the DCI grant-based uplink transmission regardless of whether another uplink transmission in a ULCG occasion conflicts with the DCI grant-based uplink transmission.

Figure 8:
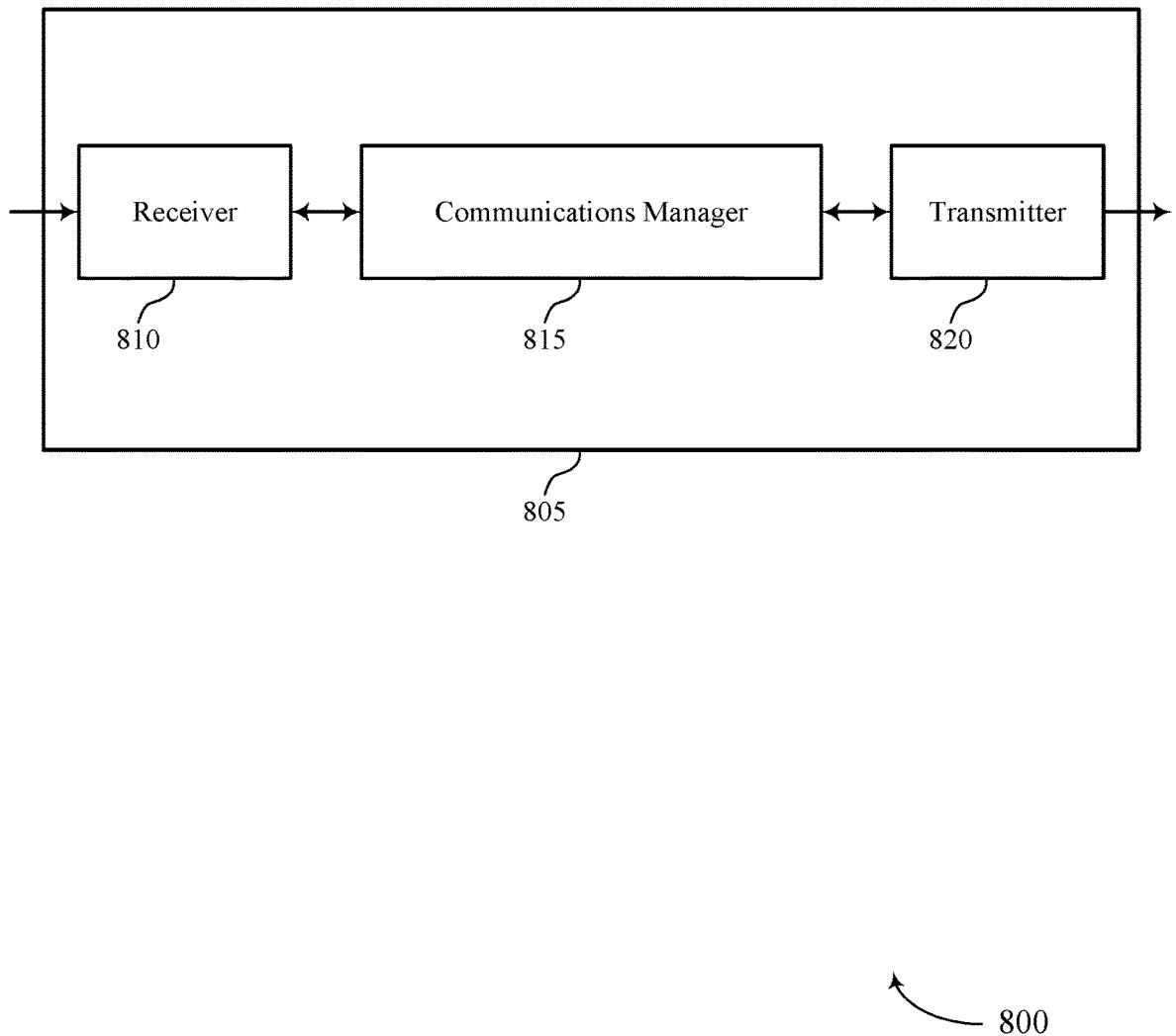
FIGS. 8 and 9 show block diagrams of devices that support uplink configured grant validation in accordance with aspects of the present disclosure.

FIG. 8 shows a block diagram 800 of a device 805 that supports uplink configured grant validation in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink configured grant validation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may obtain a semi-static uplink grant received from a base station, the semi-static uplink grant scheduling a set of uplink transmission occasions, the set of uplink transmission occasions including an uplink transmission occasion for a first uplink transmission, obtain, before a scheduled transmit time of the first uplink transmission, downlink control information received from the base station, the downlink control information including a grant for a second uplink transmission, where the second uplink transmission conflicts with the first uplink transmission, and output data for one of the first uplink transmission or the second uplink transmission based on a comparison of a receive time of the downlink control information and the scheduled transmit time of the first uplink transmission. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may allow the device 805 to efficiently determine whether to transmit an uplink transmission scheduled by a semi-static grant or a dynamic uplink transmission scheduled by a dynamic grant, when the dynamic uplink transmission conflicts with the uplink transmission scheduled by the semi-static grant. The validation of the uplink configured grant may increase reliability and reduce latency during transmissions.

Based on techniques for uplink configured grant validation as described herein, a processor of a UE 115 (e.g., controlling the receiver 810, the transmitter 820, or the transceiver 1120 as described with reference to FIG. 11) may increase reliability and decrease signaling overhead in the communication because the UE 115 may avoid going through unnecessary configuration processes during transmissions.

Figure 9:
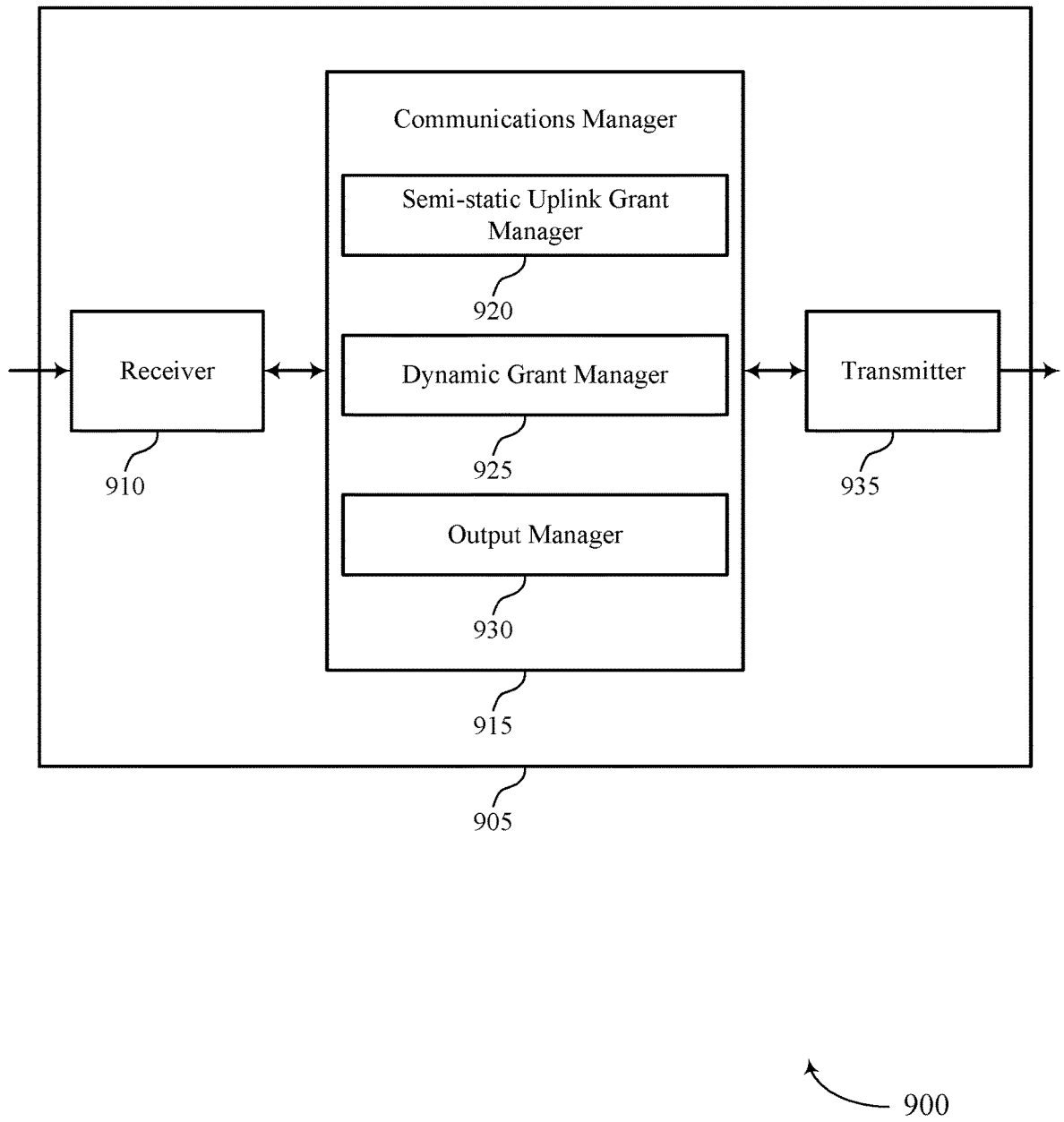

FIG. 9 shows a block diagram 900 of a device 905 that supports uplink configured grant validation in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to uplink configured grant validation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a semi-static uplink grant manager 920, a dynamic grant manager 925, and an output manager 930. The communications manager 915 may be an example of aspects of the communications manager 1110 described herein.

The semi-static uplink grant manager 920 may obtain a semi-static uplink grant received from a base station, the semi-static uplink grant scheduling a set of uplink transmission occasions, the set of uplink transmission occasions including an uplink transmission occasion for a first uplink transmission. The dynamic grant manager 925 may obtain, before a scheduled transmit time of the first uplink transmission, downlink control information received from the base station, the downlink control information including a grant for a second uplink transmission, where the second uplink transmission conflicts with the first uplink transmission. The output manager 930 may output data for one of the first uplink transmission or the second uplink transmission based on a comparison of a receive time of the downlink control information and the scheduled transmit time of the first uplink transmission.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

In some examples, the communications manager 915 may be implemented as an integrated circuit or chipset for a mobile device modem, and the receiver 910 and transmitter 935 may be implemented as analog components (e.g., amplifiers, filters, antennas) coupled with the mobile device modem to enable wireless transmission and reception over one or more bands.

The communications manager 915 as described herein may be implemented to realize one or more potential advantages. One implementation may allow the device 905 to efficiently determine whether to transmit an uplink transmission scheduled by a semi-static grant or a dynamic uplink transmission scheduled by a dynamic grant, when the dynamic uplink transmission conflicts with the uplink transmission scheduled by the semi-static grant. The validation of the uplink configured grant may increase reliability and reduce latency during transmissions.

Based on techniques for uplink configured grant validation as described herein, a processor of a UE 115 (e.g., controlling the receiver 910, the transmitter 935, or the transceiver 1120 as described with reference to FIG. 11) may increase reliability and decrease signaling overhead in the communication because the UE 115 may avoid going through unnecessary configuration processes during transmissions.

Figure 10:
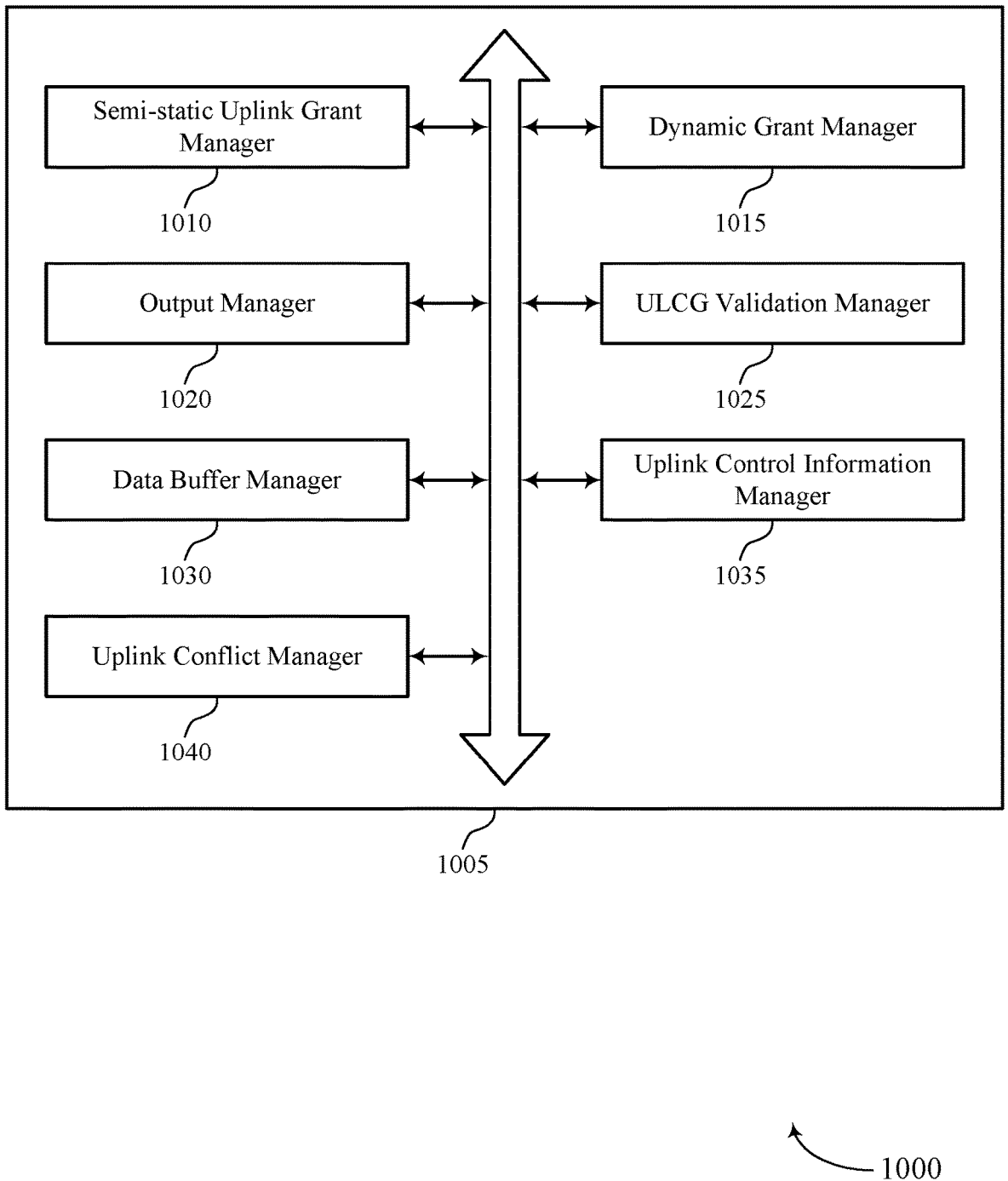
FIG. 10 shows a block diagram of a communications manager that supports uplink configured grant validation in accordance with aspects of the present disclosure.

FIG. 10 shows a block diagram 1000 of a communications manager 1005 that supports uplink configured grant validation in accordance with aspects of the present disclosure. The communications manager 1005 may be an example of aspects of a communications manager 815, a communications manager 915, or a communications manager 1110 described herein. The communications manager 1005 may include a semi-static uplink grant manager 1010, a dynamic grant manager 1015, an output manager 1020, an ULCG validation manager 1025, a data buffer manager 1030, an uplink control information manager 1035, and an uplink conflict manager 1040. Each of these modules may communicate, directly or indirectly, with one another (e.g., via one or more buses).

The semi-static uplink grant manager 1010 may obtain a semi-static uplink grant received from a base station, the semi-static uplink grant scheduling a set of uplink transmission occasions, the set of uplink transmission occasions including an uplink transmission occasion for a first uplink transmission. The dynamic grant manager 1015 may obtain, before a scheduled transmit time of the first uplink transmission, downlink control information received from the base station, the downlink control information including a grant for a second uplink transmission, where the second uplink transmission conflicts with the first uplink transmission.

The output manager 1020 may output data for one of the first uplink transmission or the second uplink transmission based on a comparison of a receive time of the downlink control information and the scheduled transmit time of the first uplink transmission. In some examples, the output manager 1020 may output data for one of the first uplink transmission or the second uplink transmission based on the determining. In some examples, the output manager 1020 may output data for the first uplink transmission based on the determining. In some examples, the output manager 1020 may refrain from outputting data for the second uplink transmission based on the determining.

In some examples, the output manager 1020 may output data for the second uplink transmission based on the determining. In some examples, the output manager 1020 may refrain from outputting data for the first uplink transmission based on the determining. In some examples, the output manager 1020 may output data for the first uplink transmission based on identifying the data to be transmitted. In some examples, the output manager 1020 may refrain from outputting data for the second uplink transmission. In some examples, the output manager 1020 may refrain from outputting data for the first uplink transmission. In some examples, the output manager 1020 may output data for the second uplink transmission.

The ULCG validation manager 1025 may determine whether the receive time of the downlink control information is within a threshold time before the scheduled transmit time of the first uplink transmission. In some examples, the ULCG validation manager 1025 may determine that the receive time of the downlink control information is within the threshold time before the scheduled transmit time of the first uplink transmission. In some examples, the ULCG validation manager 1025 may determine that the receive time of the downlink control information is in advance of the threshold time before the scheduled transmit time of the first uplink transmission.

In some examples, the ULCG validation manager 1025 may determine whether the receive time of the downlink control information is within another threshold time before a scheduled transmit time of the uplink control information transmission. In some examples, the ULCG validation manager 1025 may determine that the receive time of the downlink control information is within the other threshold time before the scheduled transmit time of the uplink control information transmission. In some examples, the ULCG validation manager 1025 may determine that the receive time of the downlink control information is in advance of the other threshold time before the scheduled transmit time of the uplink control information transmission.

In some examples, the ULCG validation manager 1025 may determine which of the first uplink transmission, the second uplink transmission, and the uplink control information transmission has an earliest starting time, where a reference point from which the threshold time is measured corresponds to the earliest starting time. In some cases, the threshold time corresponds to a processing time for processing the downlink control information. In some cases, the threshold time corresponds to a processing time for processing the downlink control information and for preparing the first uplink transmission. In some cases, the threshold time is a first threshold time corresponding to a first processing time for determining resources allocated for the second uplink transmission based on the downlink control information or a second threshold time corresponding to a second processing time for determining a hybrid automatic repeat request process identifier associated with the second uplink transmission based on the downlink control information. In some examples, the ULCG validation manager 1025 may determine which of the first uplink transmission and the second uplink transmission has an earlier starting time, wherein a reference point from which the threshold time is measured corresponds to the earlier starting time. The data buffer manager 1030 may identify data to be outputted for the first uplink transmission. In some examples, the data buffer manager 1030 may identify that there is no data to be outputted for the first uplink transmission.

The uplink control information manager 1035 may determine that an uplink control information transmission overlaps with the first uplink transmission. The uplink conflict manager 1040 may determine that the second uplink transmission conflicts with the first uplink transmission, where the outputting data for one of the first uplink transmission or the second uplink transmission is further based on the determining. In some examples, the uplink conflict manager 1040 may determine that the second uplink transmission and the first uplink transmission are scheduled on overlapping time resources. In some examples, the uplink conflict manager 1040 may determine that a HARQ process ID associated with the second uplink transmission is the same as the HARQ process ID associated with the first uplink transmission. In some examples, the uplink conflict manager 1040 may determine that a timer for the HARQ process ID associated with the first uplink transmission and the second uplink transmission is running at a scheduled transmit time of the first uplink transmission.

Figure 11:
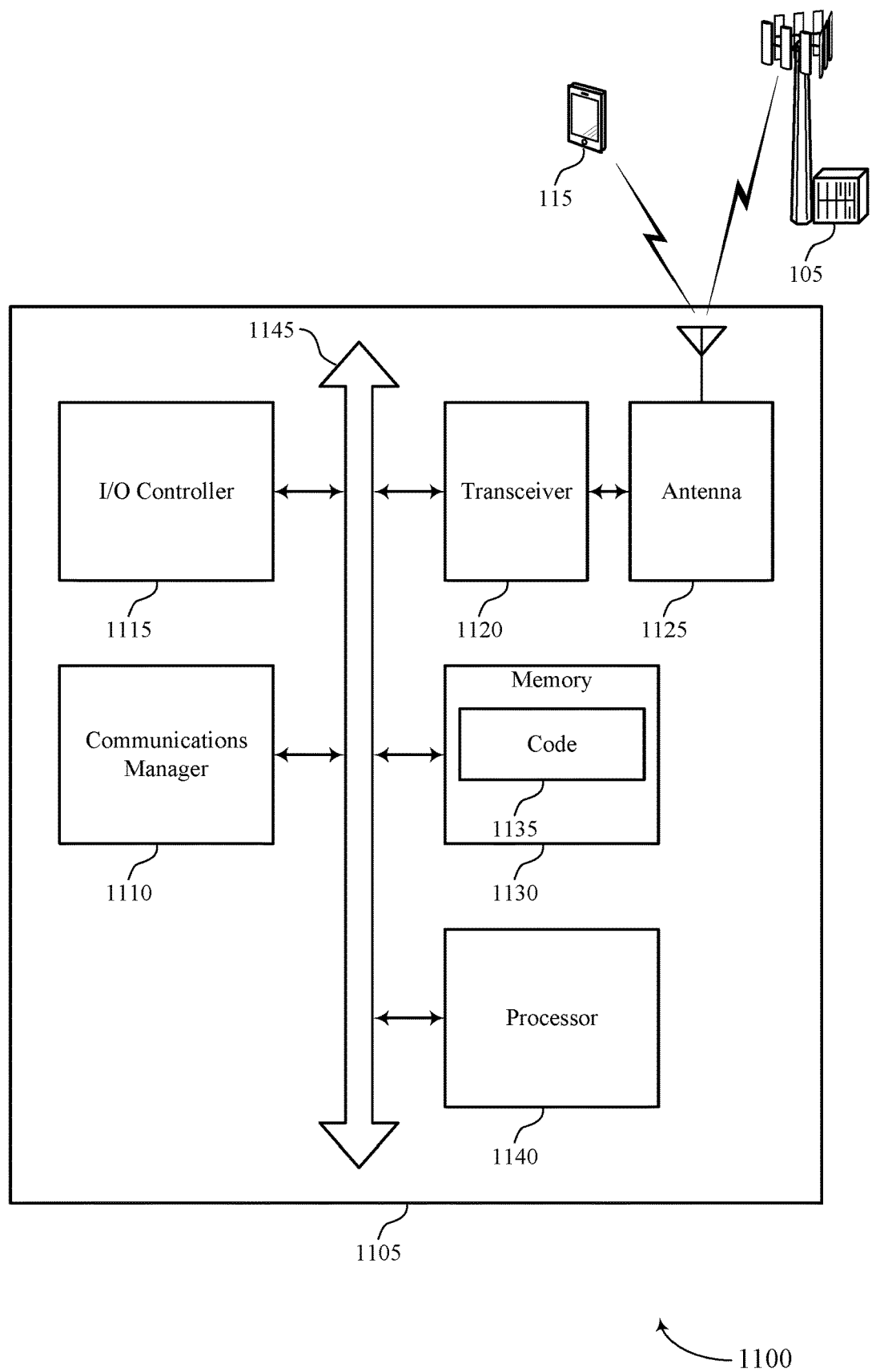
FIG. 11 shows a diagram of a system including a device that supports uplink configured grant validation in accordance with aspects of the present disclosure.

FIG. 11 shows a diagram of a system 1100 including a device 1105 that supports uplink configured grant validation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may obtain a semi-static uplink grant received from a base station, the semi-static uplink grant scheduling a set of uplink transmission occasions, the set of uplink transmission occasions including an uplink transmission occasion for a first uplink transmission, obtain, before a scheduled transmit time of the first uplink transmission, downlink control information received from the base station, the downlink control information including a grant for a second uplink transmission, where the second uplink transmission conflicts with the first uplink transmission, and output data for one of the first uplink transmission or the second uplink transmission based on a comparison of a receive time of the downlink control information and the scheduled transmit time of the first uplink transmission.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink configured grant validation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
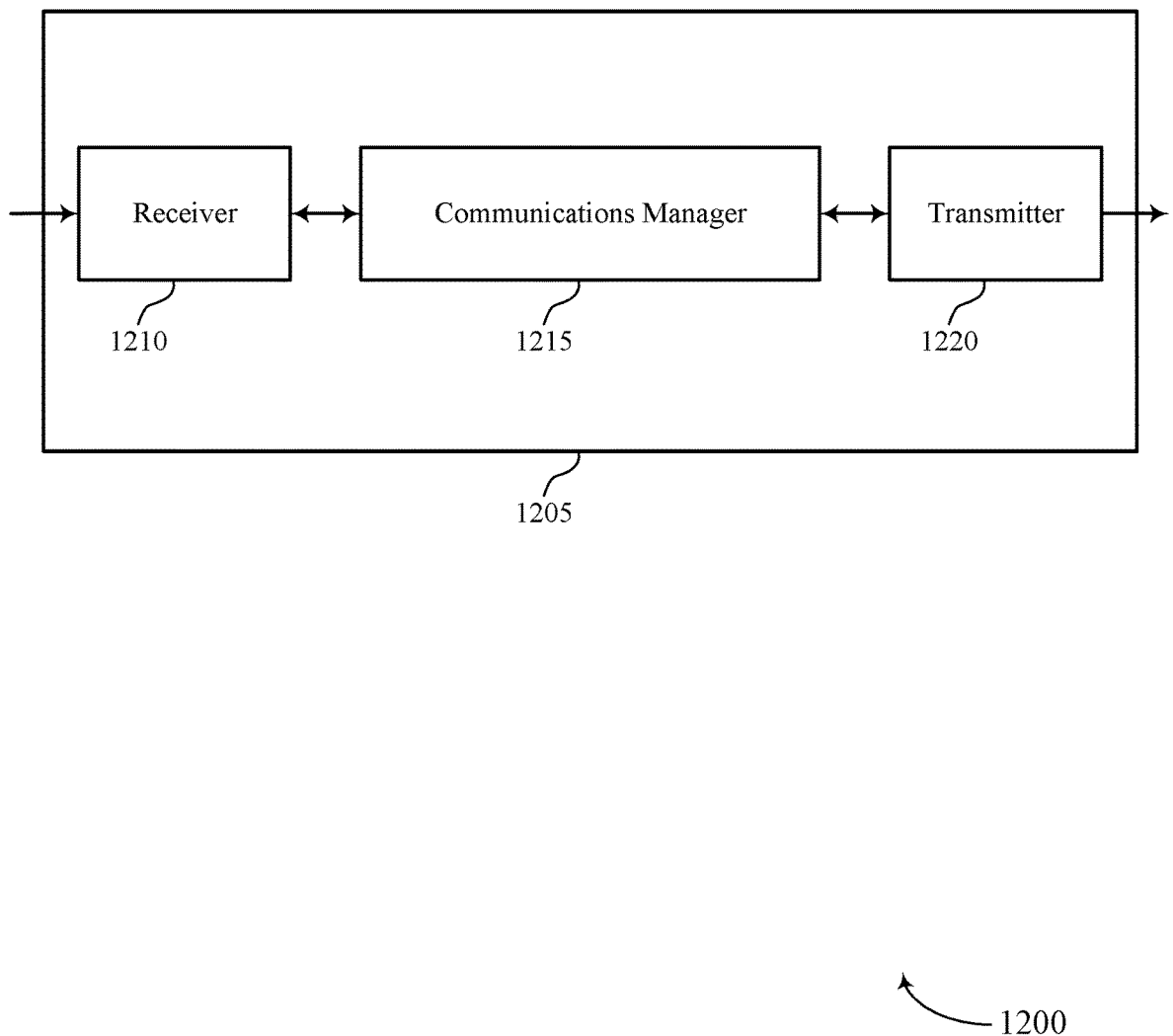
FIGS. 12 and 13 show block diagrams of devices that support uplink configured grant validation in accordance with aspects of the present disclosure.

FIG. 12 shows a block diagram 1200 of a device 1205 that supports uplink configured grant validation in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink configured grant validation, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may output data for a semi-static uplink grant to a UE, the semi-static uplink grant scheduling a set of uplink transmission occasions, the set of uplink transmission occasions including an uplink transmission occasion for a first uplink transmission, output, before a scheduled receive time of the first uplink transmission, data for downlink control information to the UE, the downlink control information including a grant for a second uplink transmission, where the second uplink transmission conflicts with the first uplink transmission, and obtain one of the first uplink transmission or the second uplink transmission received from the UE based on a comparison of a transmit time of the downlink control information and the scheduled receive time of the first uplink transmission.

The communications manager 1215 may also output data for a semi-static uplink grant to a UE, the semi-static uplink grant scheduling a set of uplink transmission occasions, generate downlink control information that includes a grant for a downlink control information grant-based uplink transmission, and output data for the downlink control information to transmit to the UE, where a transmit time of the downlink control information is outside of a threshold time before each uplink transmission occasion of the set of uplink transmission occasions. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
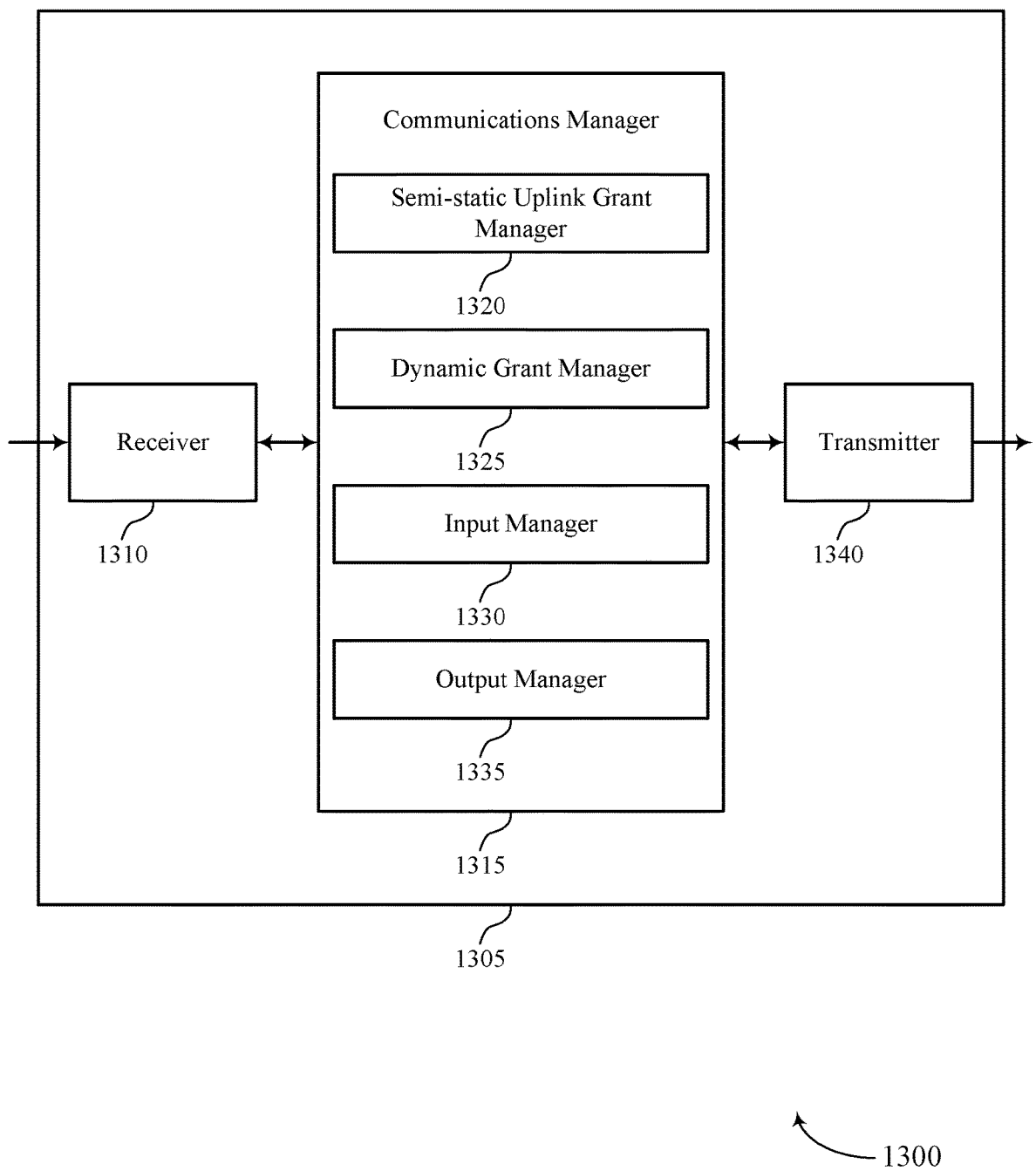

FIG. 13 shows a block diagram 1300 of a device 1305 that supports uplink configured grant validation in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink configured grant validation, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a semi-static uplink grant manager 1320, a dynamic grant manager 1325, an input manager 1330, and an output manager 1335. The communications manager 1315 may be an example of aspects of the communications manager 1510 described herein.

The semi-static uplink grant manager 1320 may output data for a semi-static uplink grant to a UE, the semi-static uplink grant scheduling a set of uplink transmission occasions, the set of uplink transmission occasions including an uplink transmission occasion for a first uplink transmission. The dynamic grant manager 1325 may output, before a scheduled receive time of the first uplink transmission, data for downlink control information to the UE, the downlink control information including a grant for a second uplink transmission, where the second uplink transmission conflicts with the first uplink transmission. The input manager 1330 may obtain one of the first uplink transmission or the second uplink transmission received from the UE based on a comparison of a transmit time of the downlink control information and the scheduled receive time of the first uplink transmission.

The semi-static uplink grant manager 1320 may output data for a semi-static uplink grant to a UE, the semi-static uplink grant scheduling a set of uplink transmission occasions. The dynamic grant manager 1325 may generate downlink control information that includes a grant for a downlink control information grant-based uplink transmission. The output manager 1335 may output data for the downlink control information to transmit to the UE, where a transmit time of the downlink control information is outside of a threshold time before each uplink transmission occasion of the set of uplink transmission occasions.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
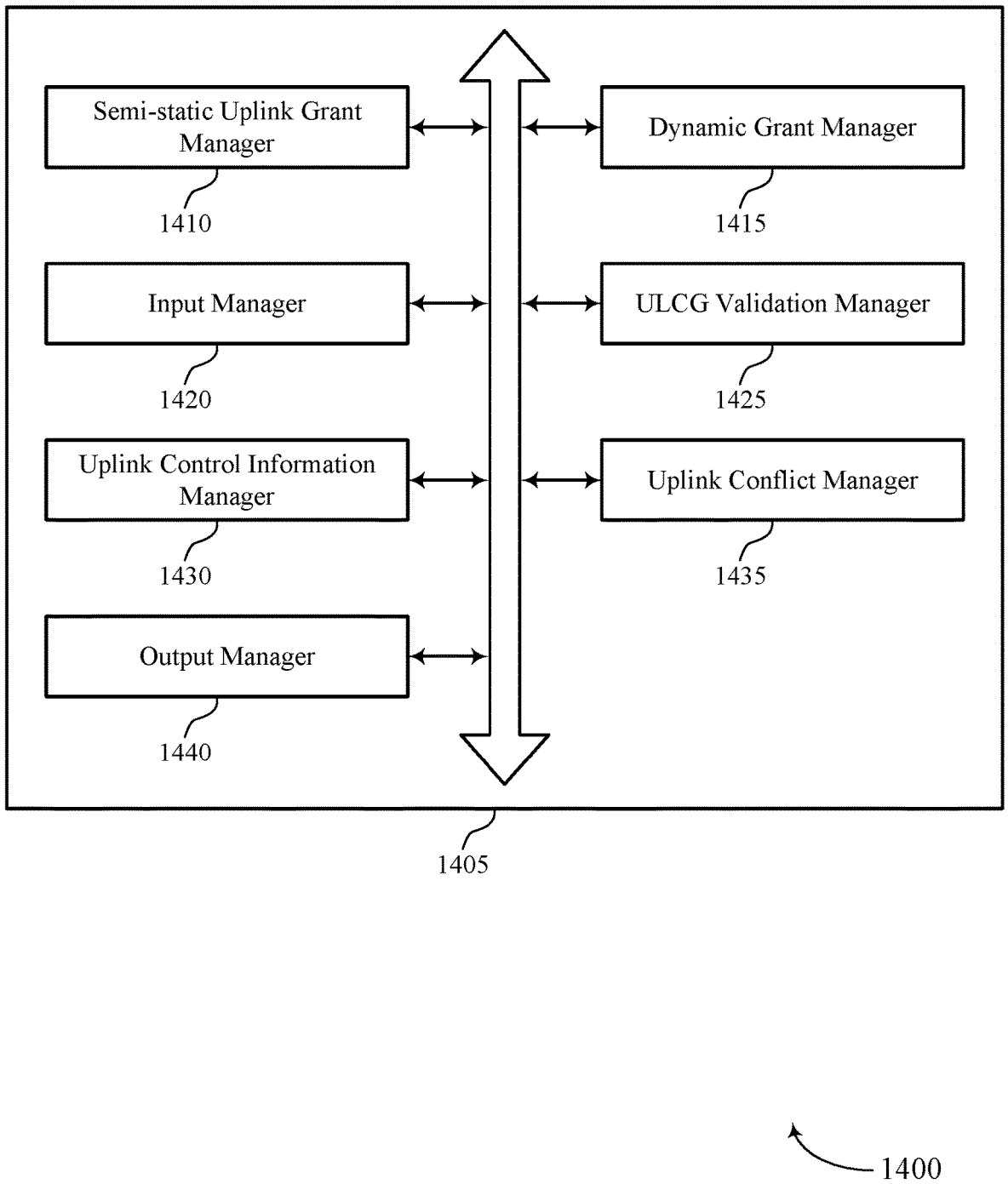
FIG. 14 shows a block diagram of a communications manager that supports uplink configured grant validation in accordance with aspects of the present disclosure.

FIG. 14 shows a block diagram 1400 of a communications manager 1405 that supports uplink configured grant validation in accordance with aspects of the present disclosure. The communications manager 1405 may be an example of aspects of a communications manager 1215, a communications manager 1315, or a communications manager 1510 (e.g., of a base station 105) as described herein. The communications manager 1405 may include a semi-static uplink grant manager 1410, a dynamic grant manager 1415, an input manager 1420, an ULCG validation manager 1425, an uplink control information manager 1430, an uplink conflict manager 1435, and an output manager 1440. Each of these modules may communicate, directly or indirectly, with one another (e.g., via one or more buses).

The semi-static uplink grant manager 1410 may output data for a semi-static uplink grant to a UE, the semi-static uplink grant scheduling a set of uplink transmission occasions, the set of uplink transmission occasions including an uplink transmission occasion for a first uplink transmission. In some examples, the semi-static uplink grant manager 1410 may output data for a semi-static uplink grant to a UE, the semi-static uplink grant scheduling a set of uplink transmission occasions.

The dynamic grant manager 1415 may output, before a scheduled receive time of the first uplink transmission, data for downlink control information to the UE, the downlink control information including a grant for a second uplink transmission, where the second uplink transmission conflicts with the first uplink transmission. In some examples, the dynamic grant manager 1415 may generate downlink control information that includes a grant for a downlink control information grant-based uplink transmission. In some examples, the dynamic grant manager 1415 may transmit the downlink control information including the grant for the downlink control information grant-based uplink transmission if the transmit time of the downlink control information is outside of a threshold time before an earliest uplink transmission occasion with which the DCI grant-based uplink transmission conflicts.

The input manager 1420 may obtain one of the first uplink transmission or the second uplink transmission received from the UE based on a comparison of a transmit time of the downlink control information and the scheduled receive time of the first uplink transmission. In some examples, the input manager 1420 may obtain one of the first uplink transmission or the second uplink transmission received from the UE based on the determining. In some examples, the input manager 1420 may obtain the first uplink transmission received from the UE based on the determining. In some examples, the input manager 1420 may refrain from monitoring for the second uplink transmission based on the determining.

In some examples, the input manager 1420 may obtain the second uplink transmission received from the UE based on the determining. In some examples, the input manager 1420 may refrain from monitoring for the first uplink transmission based on the determining. In some examples, the input manager 1420 may obtain one of the first uplink transmission or the second uplink transmission based on the determining. In some examples, the input manager 1420 may receive the downlink control information grant-based uplink transmission regardless of whether another uplink transmission in an uplink transmission occasion of the set of uplink transmission occasions conflicts with the downlink control information grant-based uplink transmission.

The output manager 1440 may output data for the downlink control information to transmit to the UE, where a transmit time of the downlink control information is outside of a threshold time before each uplink transmission occasion of the set of uplink transmission occasions. In some cases, the threshold time corresponds to a processing time for the UE to process the downlink control information. In some cases, the threshold time is a first threshold time corresponding to a first processing time for determining resources allocated for the uplink transmission based on the downlink control information or a second threshold time corresponding to a second processing time for determining a hybrid automatic repeat request process identifier associated with the uplink transmission based on the downlink control information.

The ULCG validation manager 1425 may determine whether the transmit time of the downlink control information is within a threshold time before the scheduled receive time of the first uplink transmission. In some examples, the ULCG validation manager 1425 may determine that the transmit time of the downlink control information is within the threshold time before the scheduled receive time of the first uplink transmission. In some examples, the ULCG validation manager 1425 may determine that the transmit time of the downlink control information is in advance of the threshold time before the scheduled receive time of the first uplink transmission. In some examples, the ULCG validation manager 1425 may determine whether the transmit time of the downlink control information is within another threshold time before a scheduled receive time of the uplink control information transmission.

In some examples, the ULCG validation manager 1425 may determine that the transmit time of the downlink control information is within the other threshold time before the scheduled receive time of the uplink control information transmission. In some examples, the ULCG validation manager 1425 may determine that the transmit time of the downlink control information is in advance of the other threshold time before the scheduled receive time of the uplink control information transmission. The uplink control information manager 1430 may determine that an uplink control information transmission overlaps with the first uplink transmission. The uplink conflict manager 1435 may determine that the second uplink transmission conflicts with the first uplink transmission, where the receiving the first uplink transmission or the second uplink transmission is further based on the determining.

In some examples, the uplink conflict manager 1435 may determine that the second uplink transmission and the first uplink transmission are scheduled on overlapping time resources. In some examples, the uplink conflict manager 1435 may determine that a HARQ process ID associated with the second uplink transmission is the same as the HARQ process ID associated with the first uplink transmission. In some examples, the uplink conflict manager 1435 may determine that a timer for the HARQ process ID associated with the first uplink transmission and the second uplink transmission is running at a transmit time of the first uplink transmission. In some examples, the uplink conflict manager 1435 may determine that the downlink control information grant-based uplink transmission conflicts with at least one of the set of uplink transmission occasions.

Figure 15:
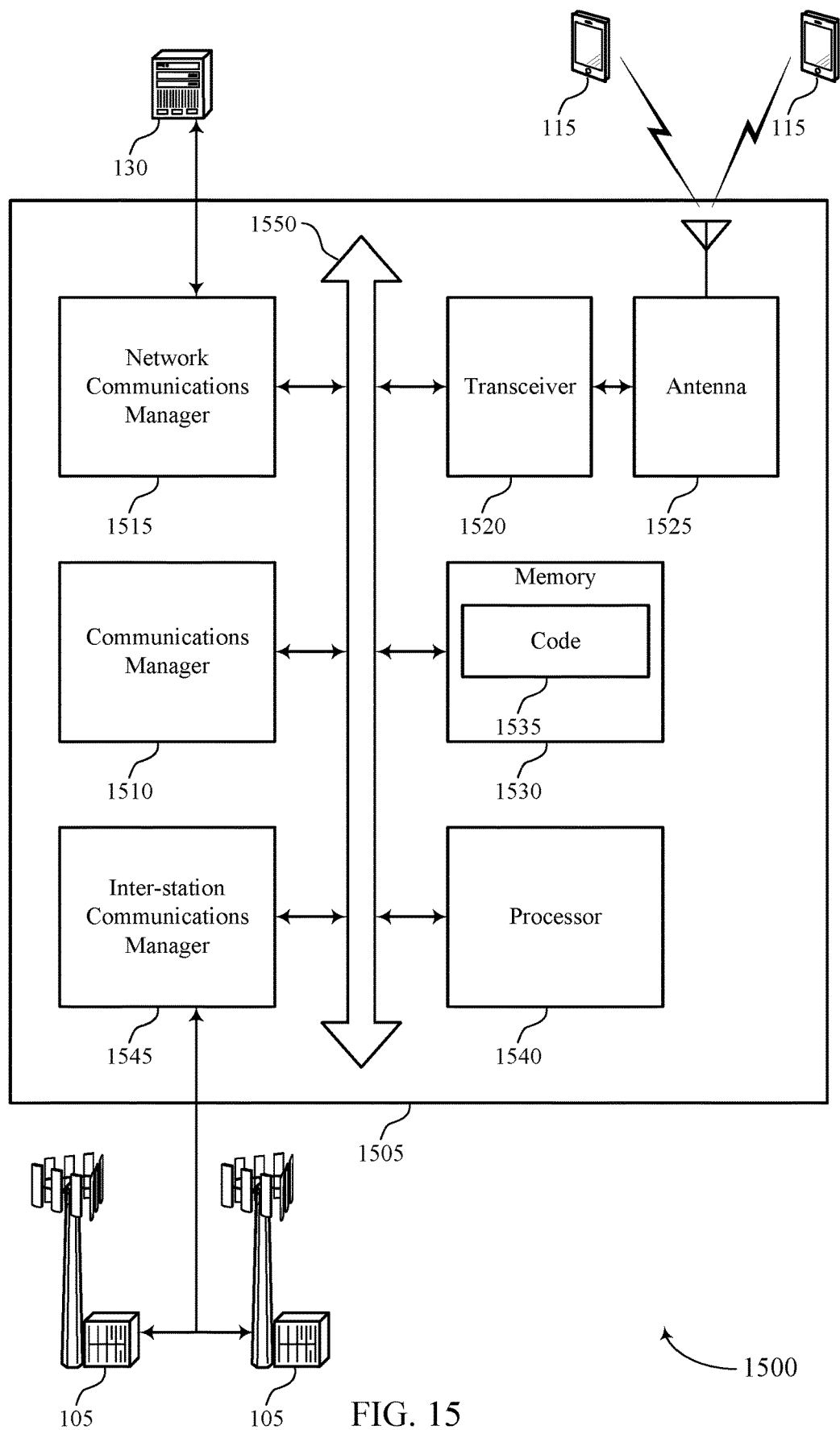
FIG. 15 shows a diagram of a system including a device that supports uplink configured grant validation in accordance with aspects of the present disclosure.

FIG. 15 shows a diagram of a system 1500 including a device 1505 that supports uplink configured grant validation in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may output data for a semi-static uplink grant to a UE, the semi-static uplink grant scheduling a set of uplink transmission occasions, the set of uplink transmission occasions including an uplink transmission occasion for a first uplink transmission, output, before a scheduled receive time of the first uplink transmission, data for downlink control information to the UE, the downlink control information including a grant for a second uplink transmission, where the second uplink transmission conflicts with the first uplink transmission, and obtain one of the first uplink transmission or the second uplink transmission received from the UE based on a comparison of a transmit time of the downlink control information and the scheduled receive time of the first uplink transmission.

The communications manager 1510 may also output data for a semi-static uplink grant to a UE, the semi-static uplink grant scheduling a set of uplink transmission occasions, generate downlink control information that includes a grant for a downlink control information grant-based uplink transmission, and output data for the downlink control information to transmit to the UE, where a transmit time of the downlink control information is outside of a threshold time before each uplink transmission occasion of the set of uplink transmission occasions.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink configured grant validation).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
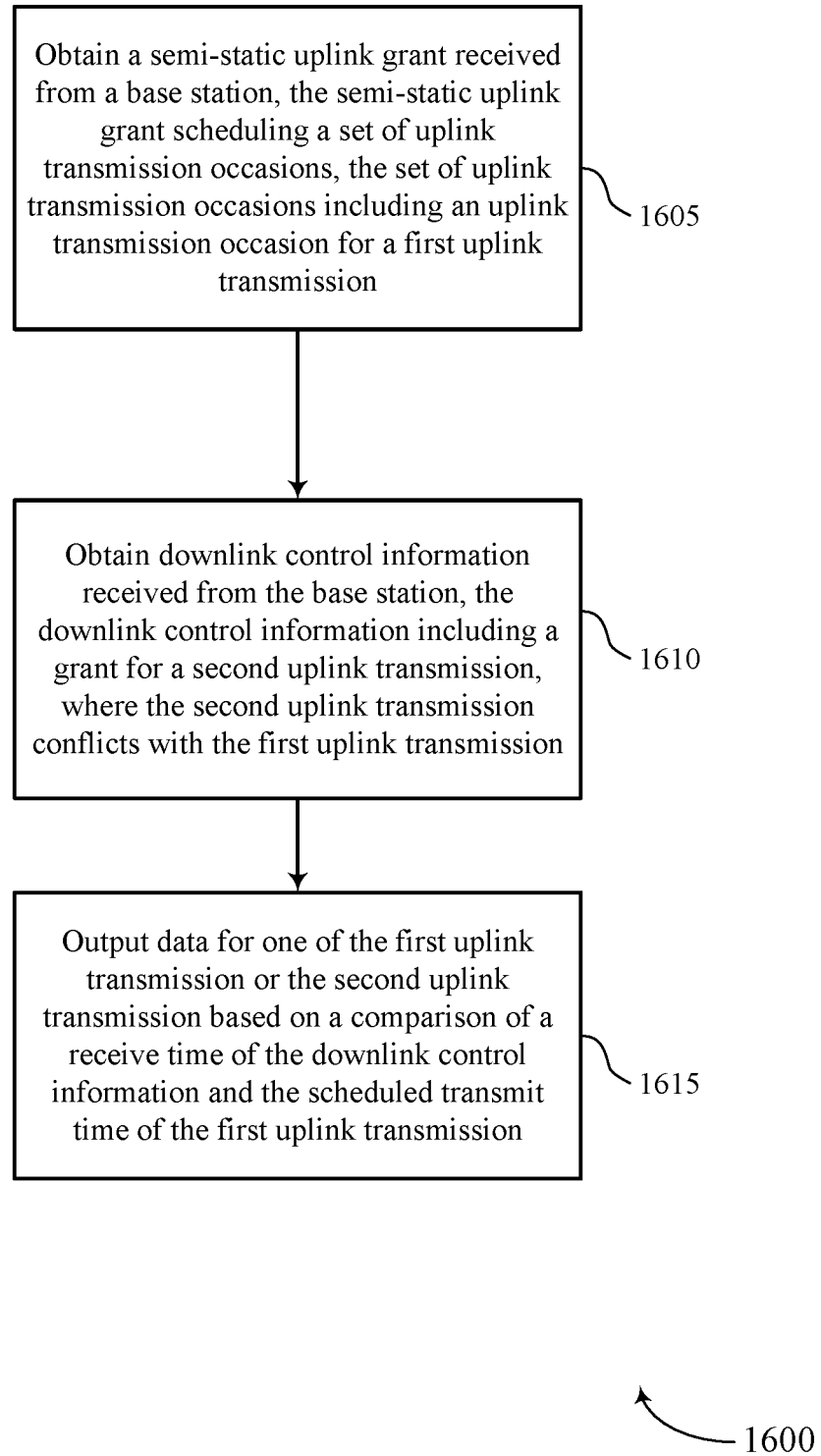
FIGS. 16-18 show flowcharts illustrating methods that support uplink configured grant validation in accordance with aspects of the present disclosure.

FIG. 16 shows a flowchart illustrating a method 1600 that supports uplink configured grant validation in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally, or alternatively, a UE may perform aspects of the functions described herein using special-purpose hardware.

At 1605, the UE may obtain a semi-static uplink grant received from a base station, the semi-static uplink grant scheduling a set of uplink transmission occasions, the set of uplink transmission occasions including an uplink transmission occasion for a first uplink transmission. The operations of 1605 may be performed according to the methods described herein. In some examples, aspects of the operations of 1605 may be performed by a semi-static uplink grant manager as described with reference to FIGS. 8 through 11.

At 1610, the UE may obtain, before a scheduled transmit time of the first uplink transmission, downlink control information received from the base station, the downlink control information including a grant for a second uplink transmission, where the second uplink transmission conflicts with the first uplink transmission. The operations of 1610 may be performed according to the methods described herein. In some examples, aspects of the operations of 1610 may be performed by a dynamic grant manager as described with reference to FIGS. 8 through 11.

At 1615, the UE may output data for one of the first uplink transmission or the second uplink transmission based on a comparison of a receive time of the downlink control information and the scheduled transmit time of the first uplink transmission. The operations of 1615 may be performed according to the methods described herein. In some examples, aspects of the operations of 1615 may be performed by an output manager as described with reference to FIGS. 8 through 11.

Figure 17:
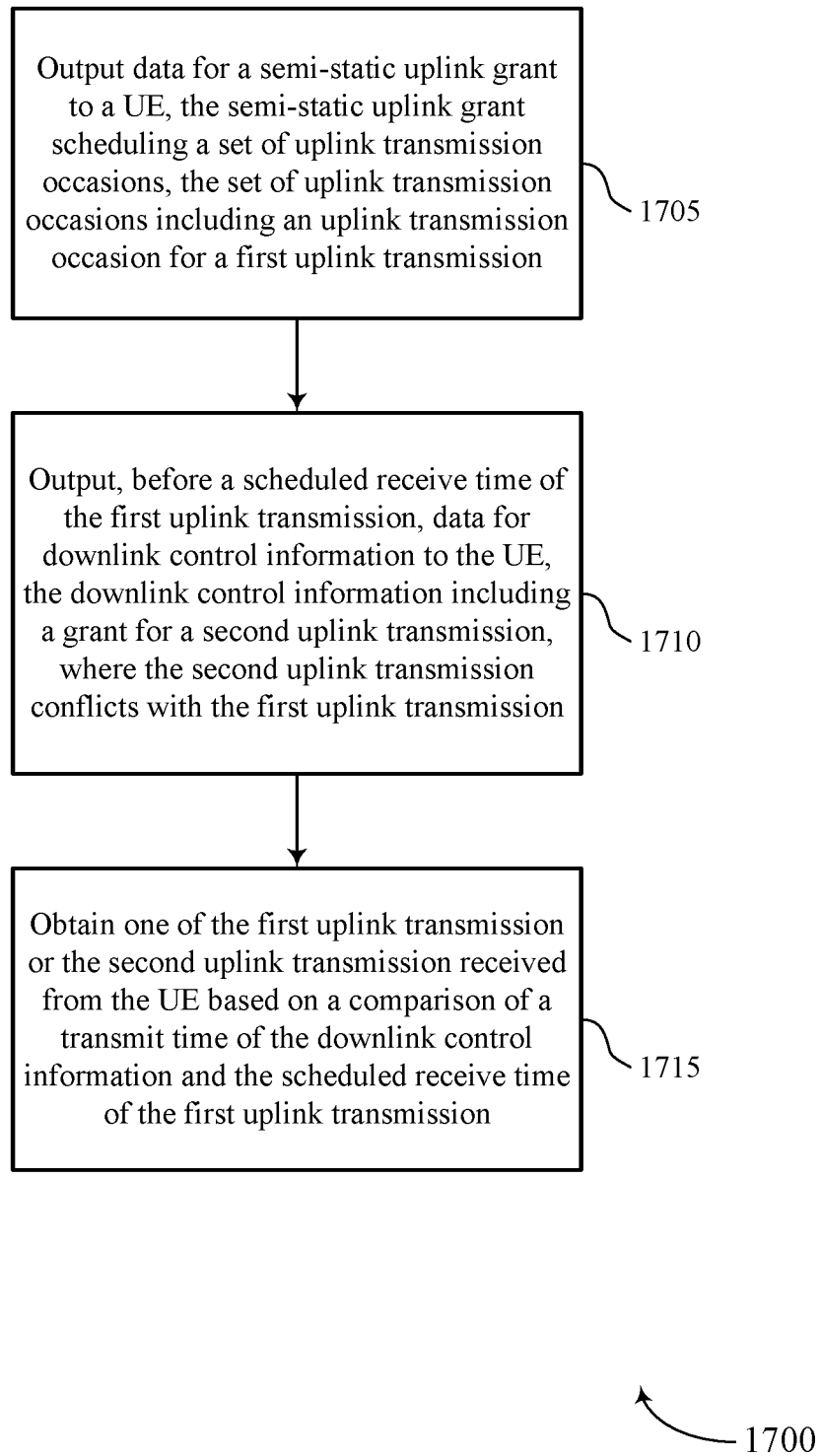

FIG. 17 shows a flowchart illustrating a method 1700 that supports uplink configured grant validation in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described herein.

Additionally, or alternatively, a base station may perform aspects of the functions described herein using special-purpose hardware.

At 1705, the base station may output data for a semi-static uplink grant to a UE, the semi-static uplink grant scheduling a set of uplink transmission occasions, the set of uplink transmission occasions including an uplink transmission occasion for a first uplink transmission. The operations of 1705 may be performed according to the methods described herein. In some examples, aspects of the operations of 1705 may be performed by a semi-static uplink grant manager as described with reference to FIGS. 12 through 15.

At 1710, the base station may output, before a scheduled receive time of the first uplink transmission, data for downlink control information to the UE, the downlink control information including a grant for a second uplink transmission, where the second uplink transmission conflicts with the first uplink transmission. The operations of 1710 may be performed according to the methods described herein. In some examples, aspects of the operations of 1710 may be performed by a dynamic grant manager as described with reference to FIGS. 12 through 15.

At 1715, the base station may obtain one of the first uplink transmission or the second uplink transmission received from the UE based on a comparison of a transmit time of the downlink control information and the scheduled receive time of the first uplink transmission. The operations of 1715 may be performed according to the methods described herein. In some examples, aspects of the operations of 1715 may be performed by an input manager as described with reference to FIGS. 12 through 15.

Figure 18:
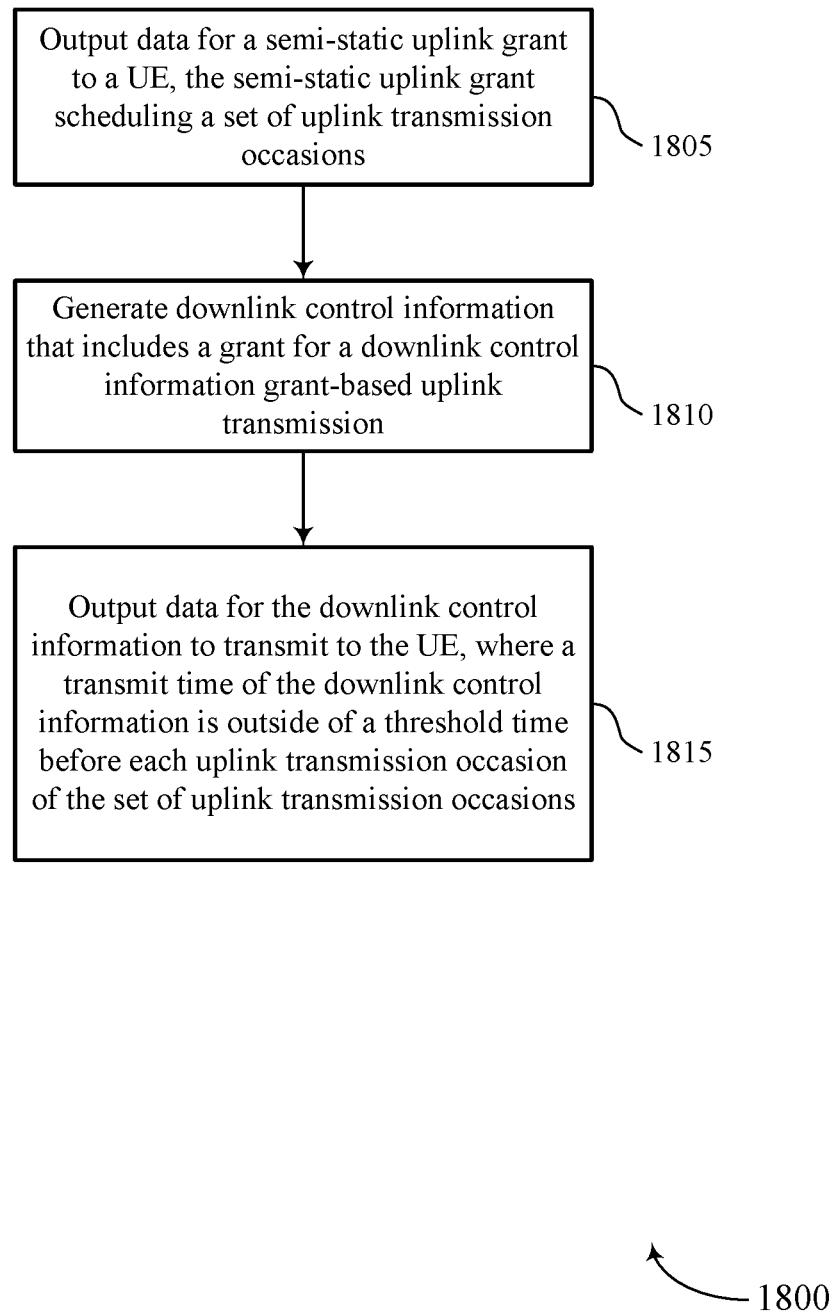

FIG. 18 shows a flowchart illustrating a method 1800 that supports uplink configured grant validation in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally, or alternatively, a base station may perform aspects of the functions described herein using special-purpose hardware.

At 1805, the base station may output data for a semi-static uplink grant to a UE, the semi-static uplink grant scheduling a set of uplink transmission occasions. The operations of 1805 may be performed according to the methods described herein. In some examples, aspects of the operations of 1805 may be performed by a semi-static uplink grant manager as described with reference to FIGS. 12 through 15.

At 1810, the base station may generate downlink control information that includes a grant for a downlink control information grant-based uplink transmission. The operations of 1810 may be performed according to the methods described herein. In some examples, aspects of the operations of 1810 may be performed by a dynamic grant manager as described with reference to FIGS. 12 through 15.

At 1815, the base station may output data for the downlink control information to transmit to the UE, where a transmit time of the downlink control information is outside of a threshold time before each uplink transmission occasion of the set of uplink transmission occasions. The operations of 1815 may be performed according to the methods described herein. In some examples, aspects of the operations of 1815 may be performed by an output manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various methods, illustrative blocks and modules described in connection with the disclosure herein may be implemented or performed by any suitable means, for example, including a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. An implementation may include a computer program comprising program instructions which are computer-executable to implement the steps of the various methods as described or parts thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Example 1

A method for wireless communication at a user equipment (UE), comprising: obtaining a semi-static uplink grant received from a base station, the semi-static uplink grant scheduling a plurality of uplink transmission occasions, the plurality of uplink transmission occasions including an uplink transmission occasion for a first uplink transmission; obtaining downlink control information received from the base station, the downlink control information including a grant for a second uplink transmission, wherein the second uplink transmission conflicts with the first uplink transmission; and outputting data for one of the first uplink transmission or the second uplink transmission based at least in part on a comparison of a receive time of the downlink control information and the scheduled transmit time of the first uplink transmission.

Example 2

The method of example 1, wherein outputting data for one of the first uplink transmission or the second uplink transmission based at least in part on the comparison comprises: determining whether the receive time of the downlink control information is within a threshold time before the scheduled transmit time of the first uplink transmission; and outputting data for one of the first uplink transmission or the second uplink transmission based at least in part on the determining.

Example 3

The method of any examples 1 or 2, further comprising: determining that the receive time of the downlink control information is within the threshold time before the scheduled transmit time of the first uplink transmission; outputting data for the first uplink transmission based at least in part on the determining; and refraining from outputting data for the second uplink transmission based at least in part on the determining.

Example 4

The method of any of examples 1 to 3, further comprising: determining that the receive time of the downlink control information is in advance of the threshold time before the scheduled transmit time of the first uplink transmission; and outputting data for the second uplink transmission based at least in part on the determining.

Example 5

The method of any of examples 1 to 4, further comprising: refraining from outputting data for the first uplink transmission based at least in part on the determining.

Example 6

The method of any of examples 1 to 5, further comprising: determining that the receive time of the downlink control information is within the threshold time before the scheduled transmit time of the first uplink transmission; identifying data to be outputted for the first uplink transmission; outputting data for the first uplink transmission based at least in part on identifying the data to be transmitted; and refraining from outputting data for the second uplink transmission.

Example 7

The method of any of examples 1 to 6, further comprising: determining that the receive time of the downlink control information is within the threshold time before the scheduled transmit time of the first uplink transmission; identifying that there is no data to be outputted for the first uplink transmission; refraining from outputting data for the first uplink transmission; and outputting data for the second uplink transmission.

Example 8

The method of any of examples 1 to 7, wherein the threshold time corresponds to a processing time for processing the downlink control information and for preparing the first uplink transmission.

Example 9

The method of any of examples 1 to 8, further comprising: determining that the second uplink transmission conflicts with the first uplink transmission, wherein the outputting data for one of the first uplink transmission or the second uplink transmission is further based at least in part on the determining.

Example 10

The method of any of examples 1 to 9, wherein determining that the second uplink transmission conflicts with the first uplink transmission comprises: determining that the second uplink transmission and the first uplink transmission are scheduled on overlapping time resources.

Example 11

The method of any of examples 1 to 10, wherein determining that the second uplink transmission conflicts with the first uplink transmission comprises: determining that a hybrid automatic repeat request (HARQ) process identifier (ID) associated with the second uplink transmission is the same as the HARQ process ID associated with the first uplink transmission.

Example 12

The method of any of examples 1 to 11, wherein determining that the second uplink transmission conflicts with the first uplink transmission comprises: determining that a timer for the HARQ process ID associated with the first uplink transmission and the second uplink transmission is running at a scheduled transmit time of the first uplink transmission.

Example 13

The method of any of examples 1 to 12, further comprising: determining that an uplink control information transmission overlaps with the first uplink transmission; determining whether the receive time of the downlink control information is within another threshold time before a scheduled transmit time of the uplink control information transmission; and outputting data for one of the first uplink transmission or the second uplink transmission based at least in part on the determining.

Example 14

The method of any of examples 1 to 13, further comprising: determining that the receive time of the downlink control information is within the other threshold time before the scheduled transmit time of the uplink control information transmission; outputting data for the first uplink transmission based at least in part on the determining; and refraining from outputting data for the second uplink transmission based at least in part on the determining.

Example 15

The method of any of examples 1 to 14, further comprising: determining that the receive time of the downlink control information is in advance of the other threshold time before the scheduled transmit time of the uplink control information transmission; outputting data for the second uplink transmission based at least in part on the determining; and refraining from outputting data for the first uplink transmission based at least in part on the determining.

Example 16

The method of any of examples 1 to 15, further comprising: determining that the receive time of the downlink control information is within the other threshold time before the scheduled transmit time of the uplink control information transmission; identifying data to be outputted for the first uplink transmission; outputting data for the first uplink transmission based at least in part on identifying the data to be transmitted; and refraining from outputting data for the second uplink transmission.

Example 17

The method of any of examples 1 to 16, further comprising: determining that the receive time of the downlink control information is within the other threshold time before the scheduled transmit time of the uplink control information transmission; identifying that there is no data to be outputted for the first uplink transmission; refraining from outputting data for the first uplink transmission; and outputting data for the second uplink transmission.

Example 18

The method of any of examples 1 to 17, further comprising: determining which of the first uplink transmission, the second uplink transmission, and the uplink control information transmission has an earliest starting time, wherein a reference point from which the threshold time is measured corresponds to the earliest starting time.

Example 19

A method for wireless communication at a base station, comprising: outputting data for a semi-static uplink grant to a user equipment (UE), the semi-static uplink grant scheduling a plurality of uplink transmission occasions; generating downlink control information that includes a grant for a downlink control information grant-based uplink transmission; and outputting data for the downlink control information to transmit to the UE, wherein a transmit time of the downlink control information is outside of a threshold time before each uplink transmission occasion of the plurality of uplink transmission occasions.

Example 20

The method of example 19, further comprising: determining that the downlink control information grant-based uplink transmission conflicts with at least one of the plurality of uplink transmission occasions; and transmitting the downlink control information including the grant for the downlink control information grant-based uplink transmission if the transmit time of the downlink control information is outside of a threshold time before an earliest uplink transmission occasion with which the downlink control information grant-based uplink transmission conflicts.

Example 21

The method of any one of examples 19 or 20, further comprising: receiving the downlink control information grant-based uplink transmission regardless of whether another uplink transmission in an uplink transmission occasion of the plurality of uplink transmission occasions conflicts with the downlink control information grant-based uplink transmission.

Example 22

The method of any of examples 19 to 21, wherein the threshold time corresponds to a processing time for the UE to process the downlink control information.

Example 23

The method of any of examples 19 to 22, wherein the threshold time corresponds to a processing time for the UE to process the downlink control information and for preparing one or more of the plurality of uplink transmissions.

Example 24

An apparatus for wireless communication comprising means configured to carry out all steps of the method of anyone of examples 1 to 18 or 19 to 23.

Example 27

The apparatus of example 26, wherein the means comprise a processor, memory in an electronic communication with the processor, and instructions stored in the memory and executable by the processor.

Example 28

A computer program comprising program instructions which are computer-executable to implement all steps of the method of any one of examples 1 to 18 or 19 to 23.

What is claimed is:

1. A method for wireless communication at a user equipment (UE), comprising:
   receiving a semi-static uplink grant, the semi-static uplink grant scheduling a plurality of uplink transmission occasions, the plurality of uplink transmission occasions including an uplink transmission occasion for a first uplink transmission;
   receiving downlink control information, the downlink control information including a grant for a second uplink transmission, wherein the second uplink transmission conflicts with the first uplink transmission;
   determining whether the downlink control information is received at least a threshold time before a scheduled transmit time of the first uplink transmission, wherein the threshold time comprises a number of symbols that corresponds to a processing time for processing the downlink control information and for preparing the second uplink transmission; and
   transmitting data for the second uplink transmission based at least in part on determining that the downlink control information is received at least the threshold time before the scheduled transmit time of the first uplink transmission.

2. The method of claim 1, further comprising:
   refraining from transmitting data for the first uplink transmission based at least in part on determining that the downlink control information is received at least the threshold time before the scheduled transmit time of the first uplink transmission.

3. The method of claim 1, further comprising:
determining that the downlink control information is received at least the threshold time before the scheduled transmit time of the first uplink transmission;
identifying that there is no data to be transmitted for the first uplink transmission;
refraining from transmitting data for the first uplink transmission, wherein transmitting data for the second uplink transmission is further based at least in part on refraining from transmitting data for the first uplink transmission.

4. The method of claim 1, further comprising:
determining that the second uplink transmission and the first uplink transmission are conflicting based at least in part on the second uplink transmission and the first uplink transmission being scheduled on overlapping time resources.

5. The method of claim 1, further comprising:
determining that the second uplink transmission and the first uplink transmission are conflicting based at least in part on a hybrid automatic repeat request (HARQ) process identifier (ID) associated with the second uplink transmission being the same as the HARQ process ID associated with the first uplink transmission.

6. The method of claim 5, wherein determining that the second uplink transmission and the first uplink transmission are conflicting comprises:
determining that a timer for the HARQ process ID associated with the first uplink transmission and the second uplink transmission is running at a scheduled transmit time of the first uplink transmission.

7. The method of claim 1, further comprising:
determining that an uplink control information transmission overlaps with the first uplink transmission;
determining whether the downlink control information is received at least another threshold time before a scheduled transmit time of the uplink control information transmission; and
transmitting data for one of the first uplink transmission or the second uplink transmission based at least in part on determining whether the downlink control information is received at least the other threshold time before the scheduled transmit time of the uplink control information transmission.

8. The method of claim 7, further comprising:
determining that the downlink control information is received at least the other threshold time before the scheduled transmit time of the uplink control information transmission, wherein transmitting data for the second uplink transmission is further based at least in part on the determining that the downlink control information is received at least the other threshold time before the scheduled transmit time of the uplink control information transmission; and
refraining from transmitting data for the first uplink transmission based at least in part on determining that the downlink control information is received at least the other threshold time before the scheduled transmit time of the uplink control information transmission.

9. The method of claim 7, further comprising:
determining that the downlink control information is received within the other threshold time before the scheduled transmit time of the uplink control information transmission;
identifying that there is no data to be transmitted for the first uplink transmission;
refraining from transmitting data for the first uplink transmission, wherein transmitting data for the second uplink transmission is further based at least in part on refraining from transmitting data for the first uplink transmission.

10. The method of claim 7, further comprising:
determining which of the first uplink transmission, the second uplink transmission, and the uplink control information transmission has an earliest starting time, wherein a reference point from which the threshold time is measured corresponds to the earliest starting time.

11. A method for wireless communication at a base station, comprising:
transmitting data for a semi-static uplink grant to a user equipment (UE), the semi-static uplink grant scheduling a plurality of uplink transmission occasions;
generating downlink control information that includes a grant for a downlink control information grant-based uplink transmission; and
transmitting the downlink control information to the UE, wherein the downlink control information is transmitted at least a threshold time before each uplink transmission occasion of the plurality of uplink transmission occasions, and wherein the threshold time comprises a number of symbols that corresponds to a processing time for the UE to process the downlink control information and prepare the downlink control information grant-based uplink transmission.

12. The method of claim 11, further comprising:
determining that the downlink control information grant-based uplink transmission conflicts with at least one of the plurality of uplink transmission occasions; and
transmitting the downlink control information including the grant for the downlink control information grant-based uplink transmission if the downlink control information is transmitted at least the threshold time before an earliest uplink transmission occasion with which the downlink control information grant-based uplink transmission conflicts.

13. The method of claim 11, further comprising:
receiving the downlink control information grant-based uplink transmission regardless of whether another uplink transmission in an uplink transmission occasion of the plurality of uplink transmission occasions conflicts with the downlink control information grant-based uplink transmission.

14. An apparatus for wireless communication at a user equipment (UE), comprising:
a processor,
memory in electronic communication with the processor; and
instructions stored in the memory and executable by the processor to cause the apparatus to:
receive a semi-static uplink grant, the semi-static uplink grant scheduling a plurality of uplink transmission occasions, the plurality of uplink transmission occasions including an uplink transmission occasion for a first uplink transmission;
receive downlink control information, the downlink control information including a grant for a second uplink transmission, wherein the second uplink transmission conflicts with the first uplink transmission;
determine whether the downlink control information is received at least a threshold time before a scheduled transmit time of the first uplink transmission, wherein the threshold time comprises a number of symbols that corresponds to a processing time for processing the downlink control information and for preparing the second uplink transmission; and transmit data for the second uplink transmission based at least in part on determining that the downlink control information is received at least the threshold time before the scheduled transmit time of the first uplink transmission.

15. The apparatus of claim 14, wherein the instructions are further executable by the processor to cause the apparatus to:

refrain from transmitting data for the first uplink transmission based at least in part on determining that the downlink control information is received at least the threshold time before the scheduled transmit time of the first uplink transmission.

16. An apparatus for wireless communication at a base station, comprising:

a processor, memory in electronic communication with the processor; and instructions stored in the memory and executable by the processor to cause the apparatus to:

transmit data for a semi-static uplink grant to a user equipment (UE), the semi-static uplink grant scheduling a plurality of uplink transmission occasions;

generate downlink control information that includes a grant for a downlink control information grant-based uplink transmission; and transmit the downlink control information to the UE, wherein the downlink control information is transmitted at least a threshold time before each uplink transmission occasion of the plurality of uplink transmission occasions, and wherein the threshold time comprises a number of symbols that corresponds to a processing time for the UE to process the downlink control information and prepare the downlink control information grant-based uplink transmission.

17. The apparatus of claim 14, wherein the instructions are further executable by the processor to cause the apparatus to:

determine that the second uplink transmission and the first uplink transmission are conflicting based at least in part on the second uplink transmission and the first uplink transmission being scheduled on overlapping time resources.

18. The apparatus of claim 14, wherein the instructions are further executable by the processor to cause the apparatus to:

determine that the second uplink transmission and the first uplink transmission are conflicting based at least in part on a hybrid automatic repeat request (HARQ) process identifier (ID) associated with the second uplink transmission being the same as the HARQ process ID associated with the first uplink transmission.

19. The apparatus of claim 18, wherein the instructions executable by the processor to cause the apparatus to determine that the second uplink transmission and the first uplink transmission are conflicting are further executable by the processor to cause the apparatus to:

determine that a timer for the HARQ process ID associated with the first uplink transmission and the second uplink transmission is running at a scheduled transmit time of the first uplink transmission.

20. The apparatus of claim 16, wherein the instructions are further executable by the processor to cause the apparatus to:

determine that the downlink control information grant-based uplink transmission conflicts with at least one of the plurality of uplink transmission occasions; and transmit the downlink control information including the grant for the downlink control information grant-based uplink transmission if the downlink control information is transmitted at least the threshold time before an earliest uplink transmission occasion with which the downlink control information grant-based uplink transmission conflicts.

21. The apparatus of claim 16, wherein the instructions are further executable by the processor to cause the apparatus to:

receive the downlink control information grant-based uplink transmission regardless of whether another uplink transmission in an uplink transmission occasion of the plurality of uplink transmission occasions conflicts with the downlink control information grant-based uplink transmission.

* * * * *